US005384854A

United States Patent [19]

Downs et al.

[11] Patent Number: 5,384,854

[45] Date of Patent: Jan. 24, 1995

[54] CO-PROCESSOR CONTROLLED SWITCHING APPARATUS AND METHOD FOR DISPATCHING CONSOLE

[75] Inventors: Stephen R. Downs, Forest; James L. Teel, Jr., Goode; Charles C. Herndon, Forest, all of Va.

[73] Assignee: Ericsson GE Mobile Communications Inc., Lynchburg, Va.

[21] Appl. No.: 835,690

[22] Filed: Feb. 14, 1992

[51] Int. Cl.⁶ .......... H04B 3/00

[52] U.S. Cl. .......... 381/81; 379/211; 379/267; 379/269; 379/203; 381/123

[58] Field of Search .......... 379/211, 267, 269, 203; 381/81, 123; 455/4.1, 6.3

[56] References Cited

U.S. PATENT DOCUMENTS

| | | | |
|---|---|---|---|
| 3,809,810 | 5/1974 | Walker et al. | 381/81 |
| 4,028,498 | 6/1977 | Mehaffey et al. | 379/211 |
| 4,286,118 | 8/1981 | Mehaffey et al. | 379/267 |
| 4,726,054 | 2/1988 | Molnar | 379/269 |
| 4,972,457 | 11/1990 | O'Sullivan | 379/59 |
| 4,991,197 | 2/1991 | Morris | 379/58 |
| 5,113,431 | 5/1992 | Horn | 379/203 |
| 5,130,662 | 7/1992 | Jorgensen et al. | 381/81 |

OTHER PUBLICATIONS

Jones, "The Pye TVT Approach to Audio Control Systems", International Broadcast Engineer, vol. 6, No. 122, pp. 4–6, 8–11, Mar. 1975.

Ullah, "Master Switching Control Panel for Broadcast Studios", ABU Technical Review (Japan), No. 69, (Jul. 1980).

*Primary Examiner*—Forester W. Isen

*Attorney, Agent, or Firm*—Nixon & Vanderhye

[57] ABSTRACT

A dispatching console system (20) for handling communications transmissions includes a main processor (50) and a co-processor (52). The main processor (50) receives external console control commands which specify a desired settable (i.e., connect/disconnect) relationship between audio devices in communication with the console and issues main processor commands to the co-processor (52). The co-processor (52) controls a switching circuit (72) in an audio tower (24). The switching circuit (72) is a matrix of cross-point switches (220) which connects and disconnects selected communication devices. In addition to the main processor commands, desired settable relationships between audio devices can also be mandated by device activation input signals which are applied through the audio tower (24) to the co-processor (52).

10 Claims, 13 Drawing Sheets

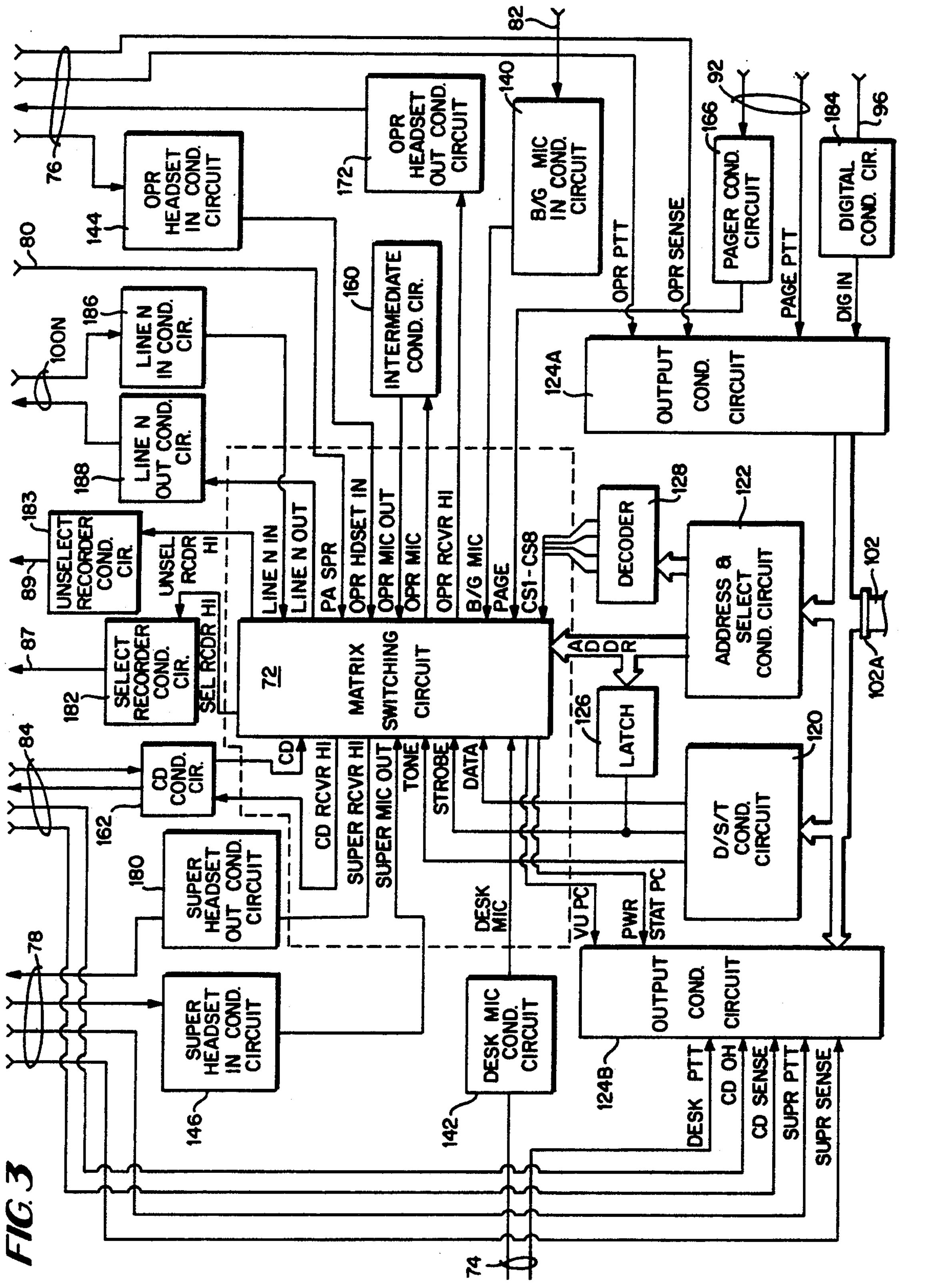

FIG. 3
72
MATRIX SWITCHING CIRCUIT
OPR HEADSET IN COND. CIRCUIT
OPR HEADSET OUT COND. CIRCUIT
B/G MIC IN COND. CIRCUIT
PAGER COND. CIRCUIT
DIGITAL COND. CIR.
INTERMEDIATE COND. CIR.
LINE N IN COND. CIR.
LINE N OUT COND. CIR.
UNSELECT RECORDER COND. CIR.
SELECT RECORDER COND. CIR.
CD COND. CIR.
SUPER HEADSET OUT COND. CIRCUIT
SUPER HEADSET IN COND. CIRCUIT
DESK MIC COND. CIRCUIT
OUTPUT COND. CIRCUIT
DECODER
ADDRESS & SELECT COND. CIRCUIT
LATCH
D/S/T COND. CIRCUIT
LINE N IN
LINE N OUT
PA SPR
OPR HDSET IN
OPR MIC OUT
OPR MIC
OPR RCVR HI
B/G MIC
PAGE
CS1-CS8
UNSEL RCDR HI
SEL RCDR HI
CD
CD RCVR HI
SUPER RCVR HI
SUPER MIC OUT
TONE
STROBE
DATA
DESK MIC
VU PC
PWR
STAT PC
A D D R
OPR PTT
OPR SENSE
PAGE PTT
DIG IN
DESK PTT
CD OH
CD SENSE
SUPR PTT
SUPR SENSE
74
76
78
80
82
84
87
89
92
96
100N
102
102A
120
122
124A
124B
126
128
140
142
144
146
160
162
166
172
180
182
183
184
186
188

CO-PROCESSOR CONTROLLED SWITCHING APPARATUS AND METHOD FOR DISPATCHING CONSOLE

BACKGROUND

1. Field of Invention

This invention pertains to dispatching consoles for a communications system, and particularly to apparatus and method for controlling switching among a plurality of communication devices interfacing with a dispatching console.

2. Prior Art and Other Considerations

Dispatching consoles have been utilized to coordinate mobile communications not only in the public sector (e.g., police and rescue operations), but also in private industry. Dispatching consoles generally have an operator input device, such as keyboard or switch board, used for connecting various communication units or devices to an out-going audio channel. An operator at the dispatching console provides audio input through a microphone, which is selectively connectable to the outgoing audio channel.

Examples of dispatching consoles are provided in the following commonly assigned United States patent applications (which are incorporated herein by reference):

(1) U.S. patent application Ser. No. 07/658,637 filed Jan. 22, 1991 by James L. Teel et al., entitled PROTOCOL BETWEEN CONSOLE AND RF TRUNKING SWITCH; and, (2) U.S. patent application Ser. No. 07/658,799 filed Feb. 22, 1991 by James L. Teel, entitled DISTRIBUTED MULTISITE COORDINATION SYSTEM.

The incorporated references show dispatching consoles or dispatching positions which are connected to a multisite switch, with the multisite switch in turn being connected to other dispatching consoles and to a plurality of sites of a trunked radio system. Each dispatching console is connected to the multisite switch by a console control link and by a plurality of audio/data channels (e.g., land telephone lines). One of the audio channels connected to the dispatching console is a "select" channel carrying a primary call which upon which the dispatching operator has selected to focus and to provide out-going audio; another of the audio channels is an "unselect" channel carrying a possible plurality of secondary calls which the operator is merely monitoring.

It is desirable to utilize numerous communications devices, such as different types of microphones and headsets, at a dispatching console. In-coming audio and out-going audio channels must be selectively routed to appropriate communications devices in an environment wherein the transmission quality of the channels is not degraded, and in a manner which does not provide undue noise or inefficiency for the audio routing apparatus.

Accordingly, it is an object of the present invention to provide method and apparatus for efficiently switching in-coming and out-going audio transmissions among a plurality of communications devices comprising a dispatching console.

SUMMARY

A dispatching console system for handling communications transmissions includes a main processor and a co-processor. The main processor receives external console control commands which specify a desired settable (i.e., connect/disconnect) relationship between audio devices in communication with the console and issues main processor commands to the co-processor. The co-processor controls a switching circuit in an audio tower. The switching circuit is a matrix of cross-point switches which "sets" (connects and disconnects) selected communication devices. In addition to the main processor commands, desired settable relationships between audio devices can also be mandated by device activation input signals which are applied through the audio tower to the co-processor. Examples of the device activation input signals are "push-to-talk" and device "sense" signals which are generated when certain audio communications devices are active.

One of the switches in the switching circuit is a selector switch which is connected to receive input audio from a plurality of audio communications devices and to couple a selected one of the connected audio communications devices to a selector switch select output path. Others of the switches are output switches, at least one of which is connected to receive an audio transmission on the selector switch select output path and to apply the received transmission as an out-going audio transmission to an audio communications device. The selector switch also couples an unselected one of the audio communication devices to a selector switch unselect output path. A summing switch is connected to receive an audio transmission on the selector switch select output path and to receive audio transmissions on a plurality of other paths, and to sum the received audio transmissions to provide a selected summed audio transmission on a selected sum output path.

The audio tower of the invention comprises a housing for the cross point switch array, as well as signal paths which are connected to device connector terminals on the housing and to a controller interface connector. The signal paths include input audio signal paths; output audio signal paths; a dry contact switch input signal path (for carrying a dry contact switch input signal indicative of a state of activation of an audio communications device); and, switch control paths. The controller interface connector terminal is connected to the dry contact switch input signal path and to the switch control paths so that the switch control signals from the controller are applied on the switch control paths for putting audio input terminals and audio output terminals of the switches in a settable relation in dependence upon the state of activation of an audio communications device as indicated by the dry contact switch input signal.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 3 is a schematic view of input/output conditioning system included in the communications and dispatching system of the embodiment of FIG. 1.

DETAILED DESCRIPTION OF THE DRAWINGS

Figure 1:
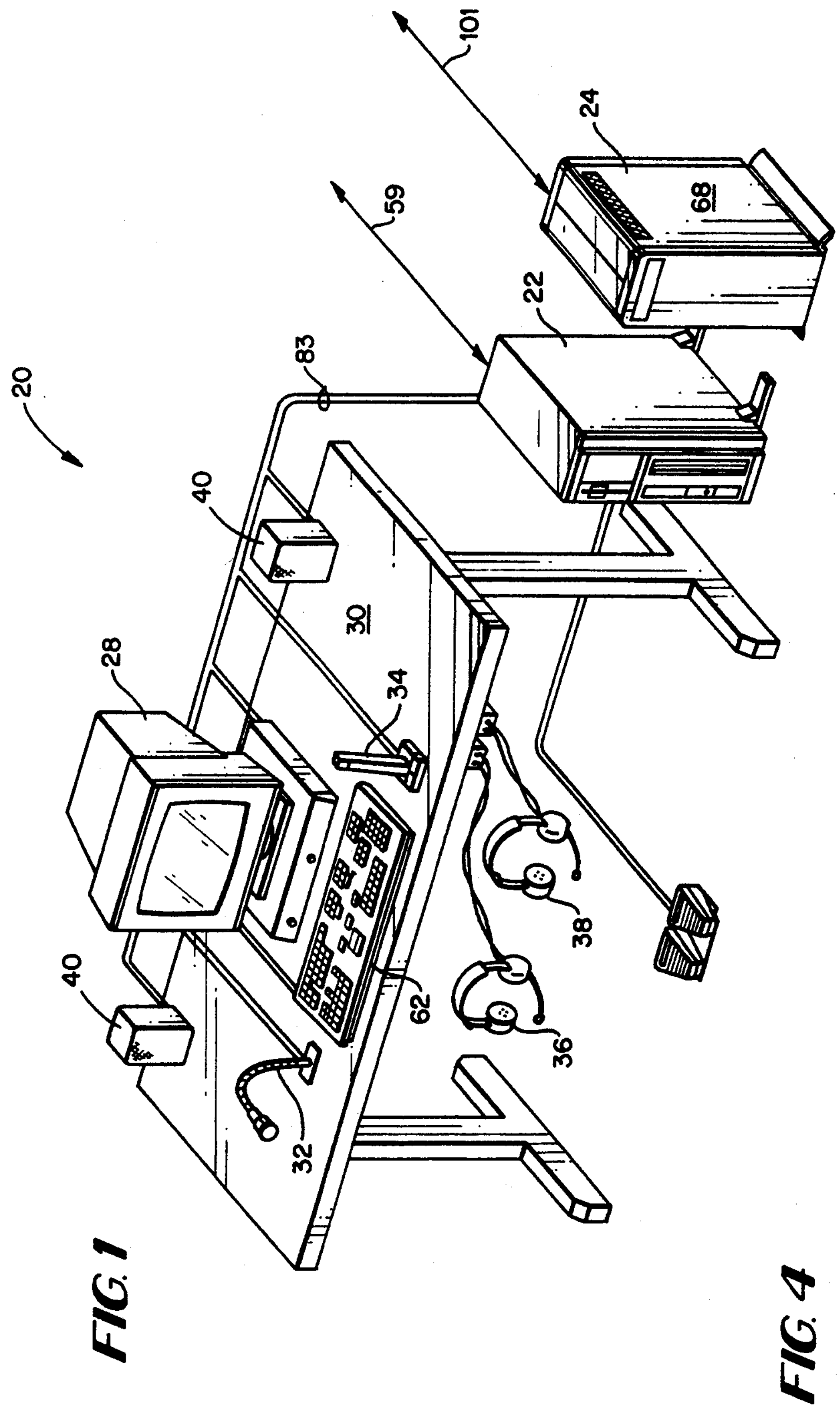
FIG. 1 is an isometric view of a communications and dispatching system according to an embodiment of the invention.

FIG. 1 shows a central office portion of a communications and dispatching system 20. The system 20 includes a system central computer (PC) cabinet 22 and an audio tower unit 24. The system central computer cabinet 22 has non-audio input/output devices connected thereto, particularly a co-processor keyboard 62 and a monitor (CRT 28 positioned on table 30. Also positioned on the table 30 are some of a plurality of communications devices included in the system 20, such as boom/gooseneck microphone 32 ("B/G mic"); a desk microphone 34; an operator headset 36; a supervisor headset 38; and, two loudspeakers 40.

Figure 2:
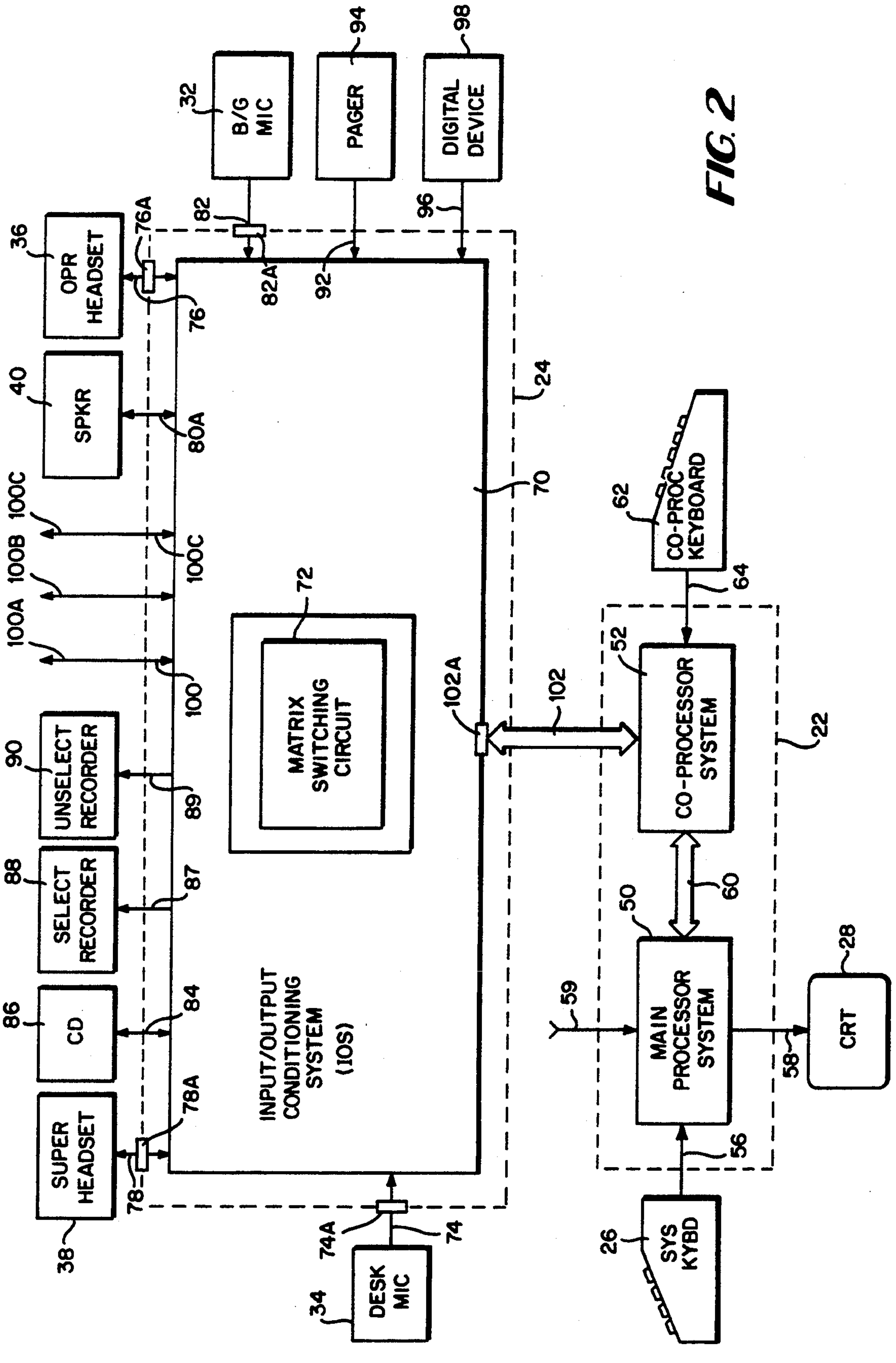
FIG. 2 is a schematic view of the communications and dispatching system of the embodiment of FIG. 1.
Figure 4A:
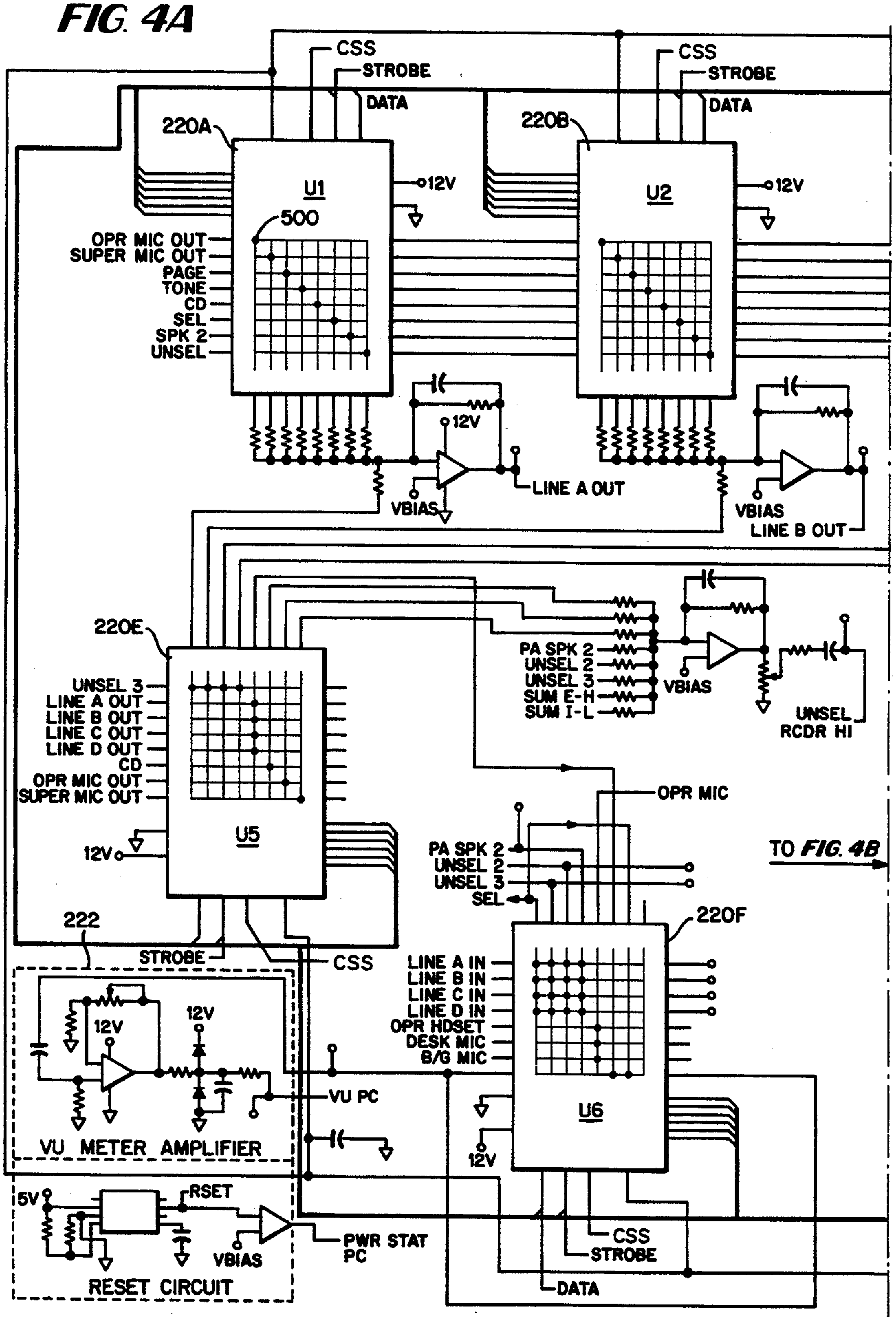
FIGS. 4A and 4B are schematic views of a matrix switching circuit included in the communications and dispatching system of the embodiment of FIG. 1.
Figure 4B:
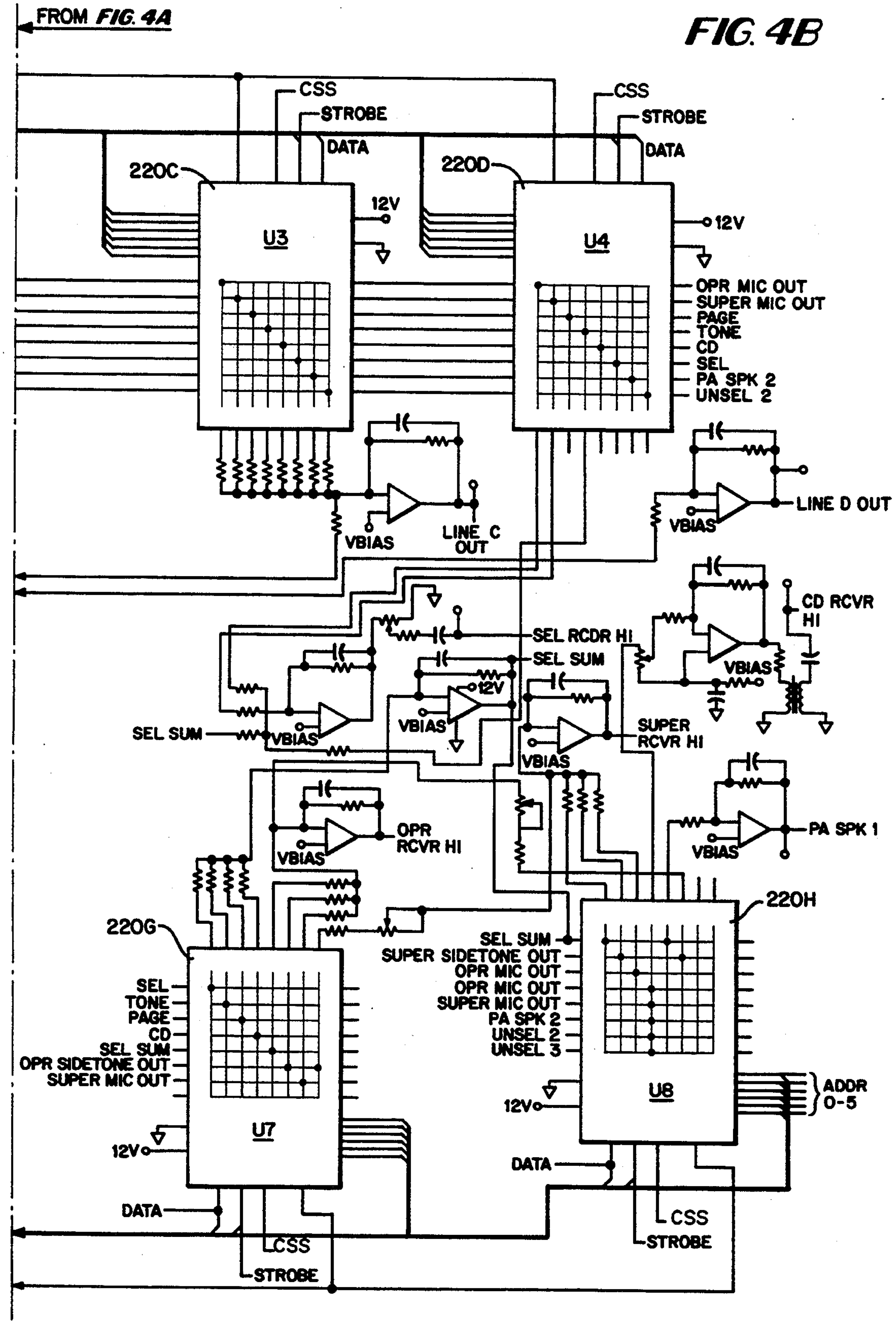

As shown in FIG. 2, the system central computer cabinet 22 houses a main processor system 50 and a co-processor system 52. The main processor system 50 is of a type suitable for operating on a PC-AT platform, and is connected by cables 56 and 58 to a system keyboard 26 and to the monitor 58, respectively. The interfacing and communications between the main processor system 50, the keyboard, and the monitor 58 are further described in commonly-assigned U.S. patent application Ser. No. 07/835,689 entitled DISPLAY CONSOLE AND USER INTERFACE FOR MULTISITE RF TRUNKED SYSTEM simultaneously filed herewith by Stephen Downs, Charles P. Brame, and Satish Kappagantula.

The main processor 50 is further connected by a console control cable 59 to a network (e.g., multisite) switch in the manner illustrated in U.S. patent application Ser. No. 07/658,637 filed Jan. 22, 1991 by James L. Teel et al., entitled PROTOCOL BETWEEN CONSOLE AND RF TRUNKING SWITCH, and U.S. patent application Ser. No. 07/658,799 filed Feb. 22, 1991 by James L. Teel, entitled DISTRIBUTED MULTISITE COORDINATION SYSTEM, both of which are incorporated herein by reference.

The co-processor system 52 resides on a board inserted into a slot on the backplane of the system central computer cabinet 22, and is connected to the main processor system 50 by a bus connector 60. A second keyboard, also known as the co-processor keyboard 62, is connected to the co-processor system 52 by a cable 64. The manner of connection of the keyboard 62 to the co-processor system 52, as well as further details of the processor system 52, are ultimately explained with reference to FIG. 5.

As also shown in FIG. 2, the audio tower unit 24 comprises an input/output conditioning system (IOS) 70 and a matrix switching circuit 72. The IOS 70 and the matrix switching circuit 72 are confined within an audio tower housing 68. Details of the input/output conditioning system 70 are hereinafter described with reference to FIG. 3; details of the matrix switching circuit are hereinafter described with reference to FIGS. 4.

FIG. 2 shows the plurality of communication units included in the communications and dispatching system 20. The audio tower housing 68 has provided thereon a plurality of device connectors which are connected within the audio tower 24 to internal signal paths (including the IOS 70) and which are connected externally to cables leading to the devices. In this respect, FIG. 2 shows the desk microphone 34 connected to the IOS by cable 74 and connector 74A; the operator headset 36 connected to the IOS by cable 76 and connector 76A; the supervisor headset 38 connected to the IOS by cable 78 and the connector 78A; the speakers 40 connected to the IOS by cable 80 and connector 80A; and, the boom/gooseneck (B/G) microphone 32 connected to the IOS by cable 82 and connector 82A. For the purposes of FIG. 1, the cables connecting the communications units are collectively shown as bundled cable 83.

Besides those communications devices already illustrated in FIG. 1, the IOS 70 of the audio tower 24 is connected to other audio communication devices. For example, the IOS 70 in the audio tower 24 is connected by a cable 84 to a call director ("CD") device 86; by cable 87 to a "select" recorder 88; by cable 89 to an "unselect" recorder 90; by cable 92 to a pager encoder 94; by a cable 96 to a serial device 98 (such as another computer); and, to external audio channel devices (e.g., telephone cables 100A–100C). In addition, the IOS 70 of the audio tower 24 is connected to the co-processor system 52 by an interface cable ("DB37") 102 through a controller interface connector terminal 102A provided on the audio tower housing 68.

The telephone cables are shown in FIG. 1 as being included in a bundled cable 101. The bundled cable 101 connected to the previously referenced network switch. In the embodiment described herein, only the telephone channels 100A and 100B are actually used for connected to the network switch, it being understood that the audio tower 24 has the potential to handle the third channel 100C.

While the communication devices listed above can be of various generic types, examples are illustrated herein. Examples of the operator and supervisor headsets 36 and 38, respectively, are two carbon (or simulated carbon) telephone-type headset microphones similar to Plantronics Model HS-0309-1. The desk microphone 34 is an electret-type microphone such as Ericsson GE DWB 19C851086P10. The Boom/Gooseneck microphone 32 is a dynamic high impedance microphone such as Shure Bros. Model VR 300. The call director device 86 is a Plant Equipment Model 3780-L1-TT 010. The digital device 98 allows for signaling to the co-processor system 52 from external digital hardware. The telephone lines 100 are each two balanced, 2-wire inputs designed to receive voice bandwidth and analog audio from a conventional 4-wire, 600-ohm twisted-pair transmission system.

It should be understood that the IOS 70 can be connected to communication devices other than those illustrated, and that more than one of various devices can be provided.

STRUCTURE: I/O CONDITIONING SYSTEM

The input/output conditioning system (IOS) 70 the audio tower 24 is shown in further detail in FIG. 3. FIG. 3 shows the cables (associated connectors not being shown in FIG. 3) which connect the IOS 70 to the aforedescribed communication devices included in the system 20, For the sake of simplicity, however, only a single telephone cable 100N is shown in FIG. 3, it being understood that the cable 100N and related circuitry therefor are representative of each of the four telephone lines to which cables 100A–100C, respectively, are connected.

FIG. 3 further shows conditioning circuits to which leads in the cable 102 (interfacing the audio tower 24 with the co-processor system 52) are connected. A D/S/T conditioning circuit 120 conditions, prior to application to the matrix switching circuit 72, DATA, STROBE, and TONE signals received on cable 102 from the co-processor system 52. An address and select conditioning circuit 122 conditions signals ADDR0–ADDR5 carried on six address leads included in the cable 102, as well as chip select signals carried on leads included in the cable 102. An output conditioning circuit (shown by reference numerals 124A and 124B) conditions certain signals, as hereinafter discussed, prior to application to the cable 102.

In the D/S/T conditioning circuit 120 the DATA and STROBE signals are connected to an RC network, to a diode protection network, and to schmitt-trigger inverters for correct levels and values. The TONE signal, being analog, is AC coupled and level-adjusted. The conditioned DATA, STROBE, and TONE signals are then applied, as shown in FIG. 3 to the matrix switching circuit 72. The STROBE signal is also applied to a latch 126 and to digital potentiometers included in the IOS 70.

The address and select conditioning circuit 122 conditions the address signals ADDR0–ADDR5 and the chip select signals by conditioning the signals with an RC network, providing diode protection, and by correcting levels and values using schmitt-trigger inverters. The conditioned address signals (shown collectively as ADDR in FIG. 3, but shown as ADDR0–ADDR5 in FIGS. 4) are applied to the matrix switching circuit 72, as well as to the latch 126. The conditioned chip select signals are applied to a decoder 128, from which chip select signals (shown as CS1–CS8) are applied to the matrix switching circuit 72.

For the most part, the output signals conditioned by the output conditioning circuits 124A and 124B are PTT (push-to-talk) voltages and/or jack sense voltages produced by various communications units, or digital inputs. The status of the PTT and jack sense inputs reflect the activity of a communications unit employing a dry-contact switch closure. Such dry-contact switch closures are utilized in push-to-talk microphones and headset jacks. For example, the signal SUPR SENSE indicates whether the supervisor headset 38 is plugged in (see FIG. 1); the signal OPR SENSE indicates whether the operator headset 36 is plugged in; the signal DESK PTT indicates whether a "talk" switch has been activated for the desk microphone 34; etc. The PTT and jack sense signals are filtered and powered by a pullup resistor, with the grounding of the circuit indicating an active condition. These "sense" and "PTT" signals are travel through the audio tower 24 on the lines illustrated in FIG. 3, which lines are also known as "paths" and in particular "dry contact switch input signal paths". As used herein, the word "path" means the particular electrical lines and/or elements though which a signal in the audio tower 24 is routed.

Other output signals include signal VU PC, a DC voltage which is proportional to a selected audio level. A signal POWER IND has a voltage indicating that the audio tower unit 24 is powered up and ready for communication with the co-processor system 52.

In addition to the aforementioned conditioning circuits connected to the cable 102 interfacing the IOS 70 with the co-processor system 52, the IOS 70 includes conditioning circuits for most of the communications units to which it is connected. Certain ones of these conditioning circuits are discussed briefly below, the details of each being understood by one of ordinary skill in the art.

The signal on cable 82 from the B/G microphone 32 is a low-level signal (since the microphone is a low-level cartridge type). The signal on cable 82 is applied to a B/G microphone input conditioning circuit 140 which AC-couples the signal, provides diode protection from static problems, and boosts the gain .using a transformer. The boosted signal is applied to a buffer amplifier with some frequency roll-off to limit response to about 3 KHz. That output is AC-coupled to a user-adjustable potentiometer to enable the user to adjust the level input of an automatic gain circuit which limits the output signal to a safe level for the matrix switching circuit 72. The signal is amplifier by a buffer amplifier prior to being applied as signal B/G MIC to the matrix switching circuit 72.

The cable 74 connecting the IOS 70 to the desk microphone 34 includes a lead for the signal DESK PTT, which is applied to the output conditioning circuit 124B, as well as an audio signal applied to a desk microphone conditioning circuit 142. The audio input from the desk microphone 34 is a high-level signal, with the circuit 142 having a resistance network to provide the bias to power the desk microphone 34. In other respects the conditioning circuit 142 performs similar functions as the conditioning circuit 140.

The cable 76 connecting the IOS 70 to the operator headset 36 includes leads for input signals OPR PTT, OPR SENSE, and an audio input signal, as well as an output signal OPR RCVR HI. The audio input lead from a microphone of the headset 36 is a moderate level signal and is applied to an operator headset input conditioning circuit 144. The circuit 144 has a resistor for providing the bias to the headset 36, as well as diode protection, AC-coupling, and other conditioning similar to that described with respect to circuit 140. The conditioned signal output from the conditioning circuit 144 is applied to the matrix switching circuit 72 as OPR HDSET IN.

The cable 78 connecting the IOS 70 to the supervisor headset 38 includes leads for input signals SUPR PTT, SUPR SENSE, and an audio input signal, as well as an output signal SUPR RCVR HI. The audio input lead from the headset 38 is also a moderate level signal and is applied to a supervisor headset input conditioning circuit 146. The circuit 146 has a resistor for providing the bias to the headset 38, as well as diode protection, AC-coupling, a digital potentiometer, and a buffer/filter circuit. The conditioned signal output is applied to the matrix switching circuit 72 as SUPER MIC OUT.

The cable 84 connecting the IOS 70 to the call director ("CD") 86 includes leads for input signals CD OH (call director "off-hook"), CD SENSE (which senses if a CD handset is active), an input audio signal, and an output audio signal. The audio input signal on cable 84 from the call director ("CD") 86 is applied to the CD conditioning circuit 162. The circuit 162 AC-couples, performs diode protection, level adjusts, and amplifies the input signal on cable 84 to apply signal CD to the matrix switching circuit 72.

The cable 92 connecting the IOS 70 to the pager encoder 94 includes leads for signals PAGE PTT and an input signal. The PAGE PTT signal is applied to the output conditioning circuit 124A; the input signal is applied to a pager conditioning circuit 166. The pager conditioning circuit 166 AC-couples the input signal to a diode protection network and through a potentiometer to a bullet amplifier prior to the signal being applied as signal PAGE to the matrix switching circuit 72.

During normal operation the co-processor system 52 selects one of the inputs B/G MIC, DESK MIC, or OPR HDSET and connects it to a line bearing signal OPR MIC, shown in FIG. 3. The signal OPR MIC is applied to an intermediate conditioning circuit 160 which limits, scales, filters (low pass and high pass), AC-couples the signal to a digital potentiometer for volume level adjustment. An amplified signal from the digital potentiometer is transmitted to the matrix switching circuit 72 as signal OPR MIC OUT.

An input audio signal to the audio tower 24 is connected, via the matrix switching circuit 72, as an output audio signal to a communication device(s) as selected by the co-processor system 52. Various ones of these output audio signals to the communications devices are also conditioned by conditioning circuitry provided in the IOS 70, as described below.

Audio destined for the operator headset 36 is transmitted as signal OPR RCVR HI to an operator headset output conditioning circuit 172 which includes a limiter, a digital potentiometer, and a low pass filter, prior to being applied on a output lead in cable 76. Audio destined for the supervisor headset 38 is transmitted as signal SUPR RCVR HI to a supervisor headset output conditioning circuit 180 (similar to operator headset conditioning circuit 172) prior to being applied on a output lead in cable 78.

Audio destined for the select recorder 88 is transmitted as signal SEL RCDR HI to a recorder conditioning circuit 182 prior to being applied on a output lead in cable 87 to the select recorder 88. Similarly, audio destined for the unselect recorder 90 is transmitted as signal UNSEL RCDR HI to a recorder conditioning circuit 183 prior to being applied on a output lead in cable 89 to the unselect recorder 90.

Audio destined for the call director ("CD") 86 is transmitted as signal CD RCDR HI to the CD conditioning circuit 162. For output purposes, the CD conditioning circuit 162 performs amplification, frequency roll-off, and level adjusting prior to the signal being output on cable 84 to the CD device 86.

Digital input provided on cable 96 from the serial device is applied to the digital conditioning circuit 184. The digital conditioning circuit 184 performs current-limiting, polarity-protecting, and opto-isolating functions prior to the signal being applied as signal DIGIN to the output conditioning circuit 124A.

The telephone lines 100A–100C (depicted generically by lines 100N in FIG. 3) each have input signals connected to a line in conditioning circuit 186. The conditioning circuit 186 performs functions of voltage protection, AC-coupling, impedance matching, voltage clamping, level adjusting, and high pass filtering on the input signal prior to transmission as signal LINE N IN to the matrix switching circuit 72. As understood with reference to FIGS. 4, N represents A, B, or C for lines A (100A), B (100B), and C (100C), respectively.

The telephone lines (e.g., audio channels) 100A–100C (depicted generically by lines 100N in FIG. 3) each have output signals LINE N OUT emanating from a line out conditioning circuit 188. The conditioning circuit 188 level adjusts the output signal and AC-couples the output signal into a differential driver to provide sufficient drive level. The signal is protected from over-voltages and external DC. The circuit 188 also clamps transients differentially and performs level adjustment prior to the signal being outputted on the output lead of line 100N.

A signal on cable 80 to the speaker 40 is sent from the matrix switching circuit 74 as signal PA SPK.

STRUCTURE: MATRIX SWITCHING CIRCUIT

Figure 4:
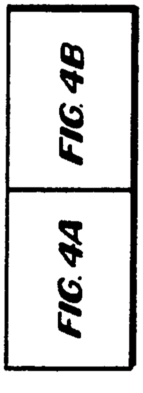
FIG. 4 is a schematic view showing the relationship of FIGS. 4A and 4B.

As shown in more detail in FIGS. 4, the matrix switching circuit 72 includes eight analog switch array units 220A–220H. In addition, the matrix switching circuit 72 includes a VU meter amplifier circuit 222 (which supplies a signal VU PC on cable 102 to the co-processor system 52) and a power monitor and reset circuit 223 (which supplies a signal POWER STAT PC to the co-processor system 52).

Each analog switch array unit 220 is an eight-by-eight analog switch array of the type bearing model number MT8809-DIP. Each analog switch array unit 220 has control input pins or terminals connected to receive the signals STROBE and DATA on similarly denominated lines or paths, as well as a bank of pins for receiving address information carried by the signals ADDR0–ADDR5. In addition, each analog switch array unit 220 is connected to receive a corresponding unique one of the chip select signals. In this respect, array 220A receives the chip select signal CS1, array 220B receives the chip select signal CS2, array 220C receives the chip select signal CS3, and so forth, through and including array 220H which receives chip select signal CS8.

Each switch array 220 can perform a number of functions. Among the functions described herein, switch array 220A–220C functions for line output. Switch array 220D functions to feed the select recorder 88. Switch array 220F functions for audio input selection and for driving the VU Meter circuit 222. Switch array 220E functions for feeding the unselect recorder 90 and for feeding unselect audio to output lines. Switch array 220G functions for summing audio with selected audio and for feeding the operator headset 36. Switch array 220H functions for feeding the supervisor headset 38, for feeding the call director 86, and for feeding the speaker 40.

The switch array units 220 are each addressed for connecting selected "X" coordinate lines or terminals with selected (or predetermined) "Y" coordinate lines or terminals. In this respect, the "Y" coordinate lines for the switch array units 220A, 220B, 220C, are, after conditioning, the respective telephone output lines LINE A OUT, LINE B OUT, and LINE C OUT, respectively. The "Y" coordinates of the switch array unit 220D are used for feeding the select recorder 88. The "X" coordinate lines for the array units 220A-220D are connected to receive signals from various of the communication devices. In this regard, the coordinates X0 through X7 for the switch array units 220-220D are connected to receive signals as set forth on TABLE 1.

TABLE 1

| coordinate | signal | ultimate source |
|---|---|---|
| X0 | OPR MIC OUT | either operator headset 36, the desk microphone 34, or the gooseneck microphone 32 |
| X1 | SUPR MIC OUT | supervisor headset 38 |
| X2 | PAGE | pager encoder 94 |
| X3 | TONE | co-processor 52 |
| X4 | CD | call director 86 |
| X5 | SEL | switch array 220F |
| X6 | PA SPK 2 | switch array 220F |
| X7 | UNSEL 2 | switch array 220F (UNSEL 2) |

The switch array 220E has X coordinates connected to receive signals as set forth on TABLE 2.

TABLE 2

| coordinate | signal | ultimate source/destination |
|---|---|---|
| X0 | SUPR MIC OUT | supervisor headset 38 |
| X1 | OPR MIC OUT | either operator headset 36, the desk microphone 34, or the gooseneck microphone 32 |
| X2 | CD | call director 86 |
| X3 | LINE D OUT | switch array 220F (UNSEL3, amplified) |
| X4 | LINE C OUT | switch array 220C |
| X5 | LINE B OUT | switch array 220B |
| X6 | LINE A OUT | switch array 220A |
| X7 | UNSEL3 | switch array 220F |

The Y0-Y2 coordinates of switch array 220E are connected to a summating network to obtain a signal UNSEL RCDR HI. The Y5-Y7 coordinates of switch array 220E are connected to provide unconditioned unselect audio input to the switch arrays 220C-220A, respectively. The Y3 coordinate of the switch array 220E is connected to the VU meter input selector of switch array 220F. The Y4 coordinate of switch array 220E is connected for amplification for a signal LINE D OUT.

The switch array 220F has coordinate X0 connected to supply an input signal to the VU meter amplifier circuit 222. The other X coordinates of the switch array 220F are connected to receive signals as set forth on TABLE 3.

TABLE 3

| coordinate | signal | ultimate source/destination |
|---|---|---|
| X1 | B/G MIC | gooseneck microphone 32 |
| X2 | DESK MIC | desk microphone 34 |
| X3 | OPR HDSET | operator headset 36 |
| X4 | LINE D IN | Line D |
| X5 | LINE C IN | Line C |
| X6 | LINE B IN | Line B |
| X7 | LINE A IN | Line A |

Coordinate Y0 of switch array 220F is not utilized. Coordinates Y4-Y7 are used to connect audio inputs (LINE A IN, LINE B IN, LINE C IN, or LINE D IN) to either a select (SEL) or to one of three "unselect" (PA SPK 2, UNSEL2, UNSEL3) audio paths. In this regard, coordinate Y7 is connected to the SEL audio path; coordinate Y6 is connected to the UNSEL3 audio path (see coordinate X7 of array 220E); coordinate Y5 is connected to the UNSEL2 audio path (see coordinate X7 of array 220A); and, coordinate Y4 is connected to carry the PA SPK 2 audio path (see coordinate X6 of array 220A). Coordinate Y3 of switch 220F is connected to carry the signal OPR MIC (see coordinate X0 of arrays 220A-220D). Coordinate Y2 of switch array 220F is tied to coordinate Y2 of switch array 220E; and, coordinate Y1 is tied to coordinate Y7 of the same array. Thus, coordinates Y1 and Y2 are inputs to a selector at coordinate X0 for the VU Meter Circuit 222.

The switch array 220G does not utilize coordinate X0. The other X coordinates of the switch array 220G are connected to receive signals as set forth on TABLE 4.

TABLE 4

| coordinate | signal | ultimate source/destination |
|---|---|---|
| X1 | SUPR MIC OUT | supervisor headset 38 |
| X2 | OPR SIDETONE OUT | operator headset 36 |
| X3 | SEL SUM | amplified sum of inputs SEL, TONE, PAGE, and CD |
| X4 | CD | call director 86 |
| X5 | PAGE | pager 94 |
| X6 | TONE | co-processor 52 |
| X7 | SEL | switch array 220F |

The Y coordinates Y1-Y3 of the switch array 220G are connected to yield the signal OPR RCVR HI and are also connected to Y coordinates of the yet-described array 220H. The Y coordinates Y4-Y7 of the switch array 220G are connected to obtain the signal SEL SUM. The coordinate Y0 connects an operator sidetone out line to the supervisor headset 38.

The switch array 220H has X coordinates connected to receive signals as set forth on TABLE 5.

TABLE 5

| coordinate | signal | ultimate source/destination |
|---|---|---|
| X0 | UNSEL3 | switch array 220F |
| X1 | UNSEL2 | switch array 220F |
| X3 | PA SPK 2 | switch array 220F |
| X4 | SUPR MIC OUT | supervisor headset 38 |
| X5 | OPR MIC OUT | operator headset 36 |
| X6 | SUPR SIDETONE OUT | supervisor headset 38 |
| X7 | SEL SUM | switch array 220G |

The Y coordinates Y0-Y1 of the switch array 220H are not utilized. The coordinate Y2 is connects a supervisor sidetone out signal to the operator headset 36. The coordinate Y3 is connected to yield the signal PA SPK 1. The coordinate Y4 is connected to yield the signal CD RCVR HI. The coordinates Y5-Y7 are connected to yield the signal SUPR RCVR HI.

STRUCTURE: CO-PROCESSOR SYSTEM

Figure 5:
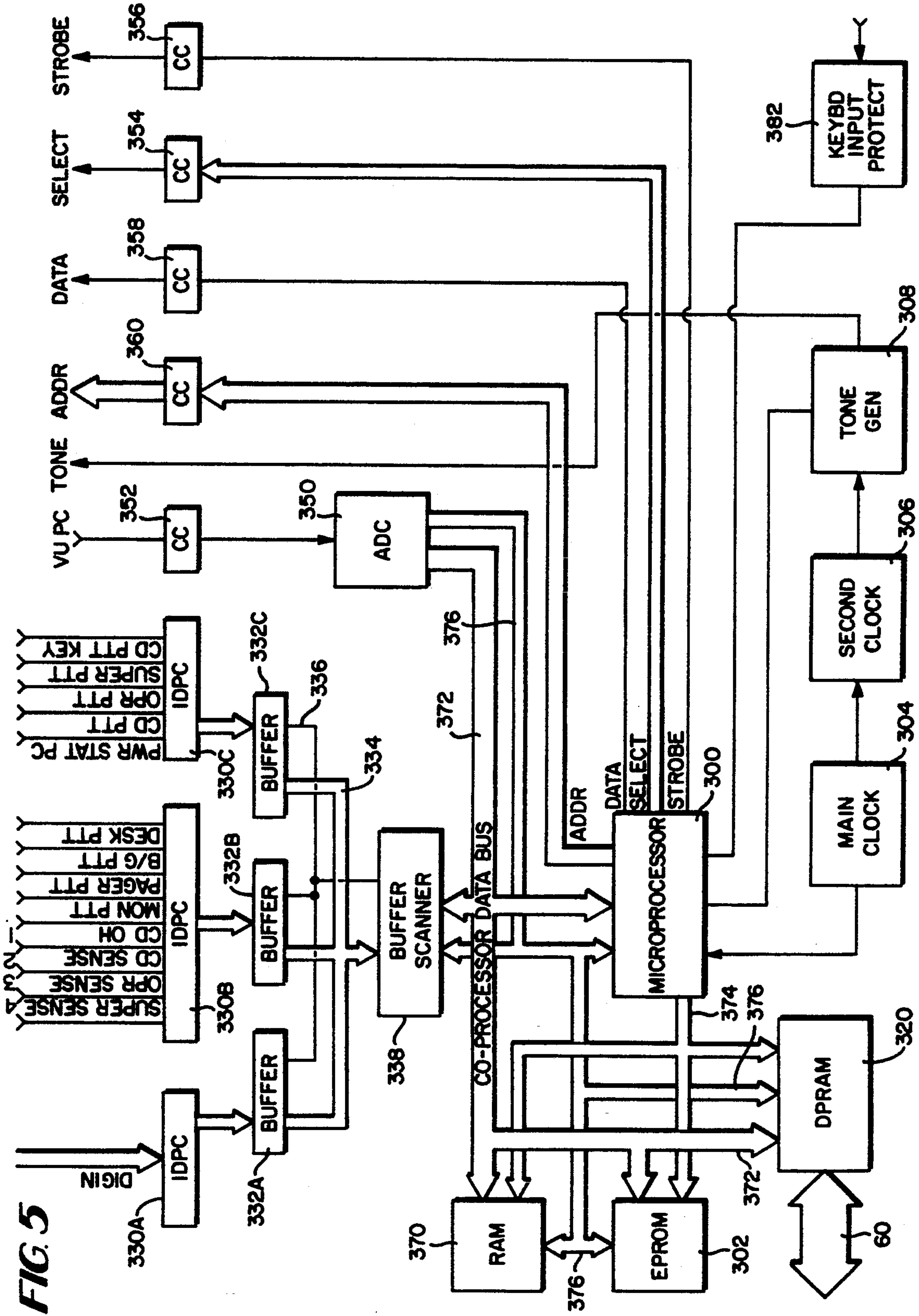
FIG. 5 is a schematic view of a co-processor system included in the communications and dispatching system of the embodiment of FIG. 1.

The co-processor system 52 is shown in further detail in FIG. 5. The heart of the co-processor system 52 is a microprocessor 300 which, in the illustrated embodiment, is a 80C152 microprocessor. Firmware executed by the microprocessor 300 is stored in an EPROM 302. The microprocessor 300 receives timing signals from a main clock 304, which also supplies timing signals to a second clock 306. Pulses from the second clock 306 are utilized by a programmable tone generator 308, which in turn produces the signal TONE for application to the audio tower 24 on interface cable 102.

Further included in the co-processor system 52 is a dual port RAM (DPRAM 320). In the illustrated embodiment, the DPRAM bears model number HM65231PLC. The DPRAM 320 handles the communication between the microprocessor 300 and the main processor system 50 over the bus connector 60.

As indicated earlier, the co-processor 52 is connected to the audio tower by the interface cable 102. The co-processor system 52 has a plurality of inverting and diode protection circuits (IDPCs) 330 (shown as circuits 330A, 330B, and 330C) for conditioning input signals received on the interface cable 102. The particular input signals applied to each of the IDPCs are shown in FIG. 5, and are primarily digital input signals, jack sense signals, and push-to-talk (PTT) signals.

The conditioned signals received from the audio tower 24 via interface cable 102 are applied to an appropriate one of three octal tri-state buffers 332 (shown as buffers 332A, 332B, and 332C). The buffers 332 are connected by a buffer data bus 334 and a buffer control bus 336 to a buffer scanner 338. In the illustrated embodiment, the buffer scanner 338 is a keyboard scanner chip bearing part number 8279.

The co-processor system 52 also includes an analog-to-digital converter (ADC) 350 for converting a signal VU PC received from the VU meter amplifier circuit 222 (in the audio tower 24) on the interface cable 102. Prior to application of the VU PC signal to the ADC 350, the VU PC signal is conditioned by a conditioner circuit (CC) 352. The conditioner circuit 352 includes protection diodes and an operational amplifier.

Selected pins of the microprocessor 300 are connected to apply signals via interface cable 102 to the audio tower 24. In this respect, pins P5.0–P5.3 are connected to form a bus for carrying a SELECT signal; pin P4.1 is connected to carry a STROBE signal; pin P4.0 is connected to carry a DATA signal; and, pins P6.0–P6.5 are connected to carry an ADDR signal. The SELECT, STROBE, DATA, and ADDR signals are conditioned by respective conditioning circuits 354, 356, 358, and 360, respectively, prior to application to the interface cable 102. The conditioning circuits 354, 356, 358, and 360 essentially are inversion (with pull-up) and diode protection circuits.

In addition to the EPROM 302 and the DPRAM 320, the co-processor system 52 includes random access memory (RAM) 370. The microprocessor 300 is connected by a co-processor data bus 372 to the ADC 350, the buffer scanner 338, the RAM 370, the EPROM 302, and the DPRAM 320. The microprocessor 300 is connected by a co-processor address bus 374 to the RAM 370, the EPROM 302, and the DPRAM 320. Further, in conventional manner, the microprocessor 300 is connected by a co-processor control bus 376 to the ADC 350, the buffer scanner 338, the RAM 370, the EPROM 302, and the DPRAM 320.

As indicated in FIG. 2, a co-processor keyboard 62 is connected to the co-processor system 52. A signal on cable 64 from the co-processor keyboard 62 is applied to a keyboard input protection circuit 382 prior to application to the microprocessor 300. the keyboard input protection circuit 382 provides inversion and diode protection functions.

OPERATION

As described in more detail below, the microprocessor 300 of the co-processor system 52 receives a scanner interrupt from the buffer scanner 338. Upon receipt of a scanner interrupt, the microprocessor 300 executes a routine SCANNER INTERRUPT described in more detail below with reference to FIG. 7.

Between interrupts the microprocessor 300 of the co-processor system 52 executes a routine MAIN LOOP. The MAIN LOOP routine, together with other routines called by MAIN LOOP, sends commands to the audio tower 24 created upon receipt of a scanner interrupt; sends commands originated by the main processor 50 to the audio tower 24; and, sets the tone generator 308. The commands of interest to the present invention which are sent to the audio tower 24 affect the matrix switching circuit 72, in particular the cross point switch arrays 220. Other commands affect settings of elements included in the audio tower 24, such as digital potentiometers included in the IOS 70.

When the microprocessor 300 sends a command to the audio tower 24 for affecting the matrix switching circuit 72, the microprocessor 300 applies signals on the address bus ADDR, on the DATA line, on the SELECT line, and on the STROBE line. The signals are used to either connect or disconnect, in accordance with the timing of the STROBE signal, a particular one of the cross point switches of an addressed one of the arrays 220. As illustrated in FIGS. 4, the cross point switches which may be connected or disconnected by the microprocessor 300 are illustrated as having dots at the intersection of the X and Y coordinates. An example is dot 500 which shows a cross point switch for coordinates X0 and Y0 for switch array 220A.

Whether a command is for the purpose of connecting or disconnecting a particular cross point switch is indicated by the value of the signal DATA. In the illustrated embodiment, a high value for signal DATA is indicative of a connection. The particular switch array 220 in the matrix switching circuit 72 which is affected by a command is indicated by the value of the signal SELECT. The decoder 128 receives the conditioned signal SELECT and generates an appropriate one of a set of chip select signals CS1–CS8 corresponding to the switch arrays 220A–220H, respectively. The affected coordinates of the chip are indicated by the value carried on the bus ADDR. In the illustrated embodiment, the X coordinate value is indicated by the lowest order three bits and the Y coordinate value is indicated by the next lowest order three bits.

In the ensuing description of the program executed by the microprocessor 300, the issuance of a command (which includes a command input state) by the microprocessor 300 affecting one of the switch arrays 220 (with the STROBE, DATA, ADDR, and SELECT signals) is indicated by an odd numbered processing step. As shown in the drawings, each odd numbered processing step begins with either the alternative phrase "Connect/Disconnect" or the alternative phrase "Disconnect/Connect". The alternative phrase "Connect/Disconnect" indicates that the specified cross point switch is to be connected when the command input state is high and disconnected when the command input state is low. Conversely, the alternative phrase "Disconnect/Connect" indicates that the specified cross point switch is to be disconnected when the command input state is high and connected when the command input state is low. The "setting" of a switch, as used herein, means the connection (e.g., closing the switch) or disconnection (e.g., opening the switch), depending on the value of signal DATA of a specified cross point switch of the switch array. A high value of the signal DATA requires a connection and a low signal requires a disconnection. Each odd numbered processing step is shown in the drawings as including a bracketed expression of the following format: [N-Y-X], wherein "N" indicates the number (i.e., alphabetical suffix) of the affected switch array 220; "Y" indicates the Y coordinate value, and "X" indicates the X coordinate value.

OPERATION: INTERRUPTS

As indicated above, the microprocessor 300 receives numerous interrupts, of importance here being a scanner interrupt. A scanner interrupt occurs when one of the inputs from the audio tower 24 on interface cable 102 changes state. These inputs are shown in FIG. 5 as being connected to the inversion diode protection circuits (IDPC) 330, from whence they are stored in an appropriate one of the buffers 332. When one of these inputs from the tower 24 changes state, the buffer scanner 338 applies an interrupt on the control bus 376 to the microprocessor 300. The scanner 338 does not inform the microprocessor 300 which input changed state, only that a change has occurred.

Figure 7:
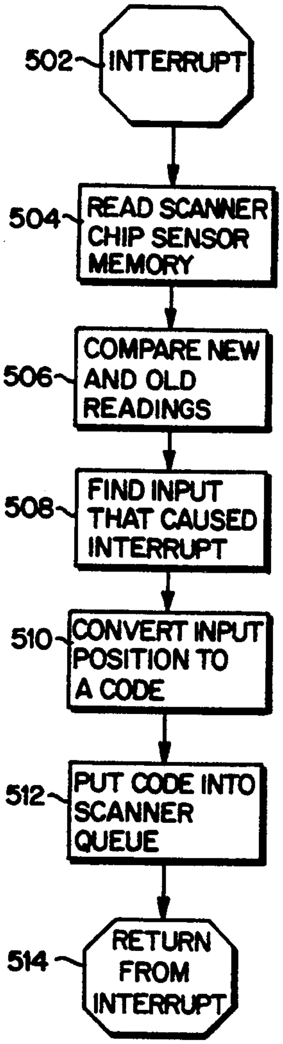
FIG. 7 is a schematic view of steps executed by a scanner interrupt routine of the communications and dispatching system of the embodiment of FIG. 1.

Upon the receipt of a scanner interrupt, the microprocessor 300 executes the routine SCANNER INTERRUPT stored in EPROM 302 and depicted by the steps shown in FIG. 7. After receipt of the scanner interrupt (step 502), the microprocessor 300 reads an internal memory of the buffer scanner 338 (step 504), and compares the contents of the internal memory to the previous contents of the memory for determining which input changed state (506). Using the comparison, the microprocessor finds the changed input value that caused the interrupt (step 508), and creates a code which is dependent upon the interrupt-causing input (step 510). These codes have the binary format s00bbiii, where "s" is the on/off (e.g., high/low) command input state; "bb" is the input buffer number (114 3); and "iii" is the input number (0–7) on each buffer. The microprocessor then stores the code created at step 510 in a queue SCANNER QUEUE located in in the internal RAM of the microprocessor 300 (step 512), and breaks from execution of the routine SCANNER INTERRUPT (step 514). As seen hereinafter, the routine MAIN LOOP consults SCANNER QUEUE.

OPERATION: MAIN LOOP

Figure 8:
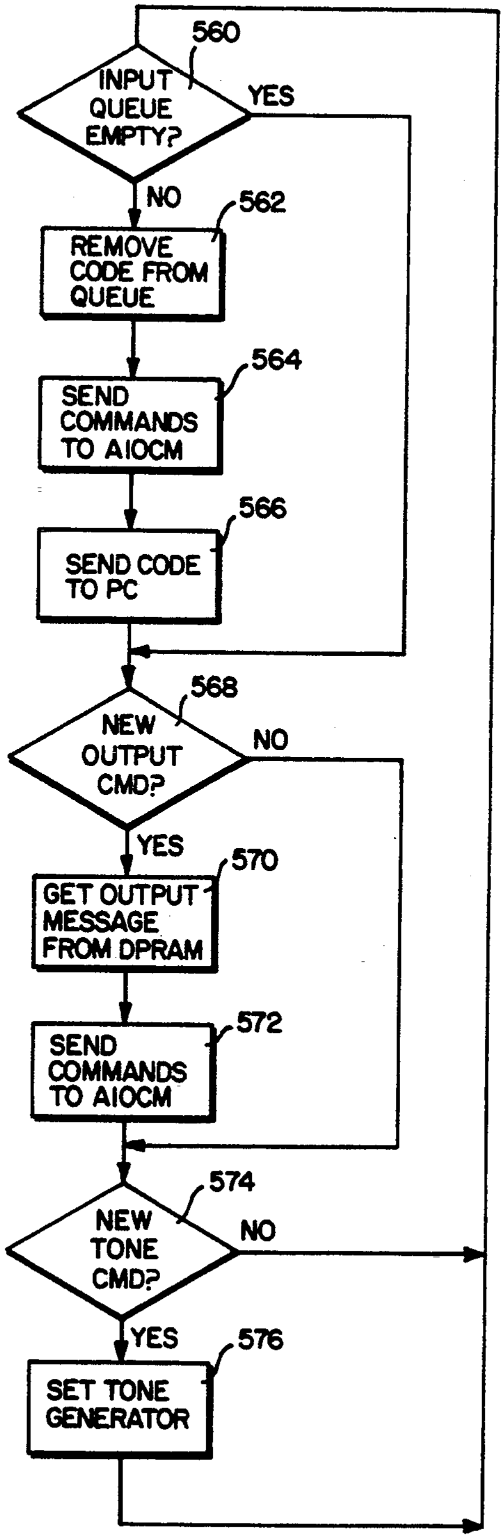
FIG. 8 is a schematic view of steps executed by a main loop processing routine of the communications and dispatching system of the embodiment of FIG. 1.
Figure 9A:
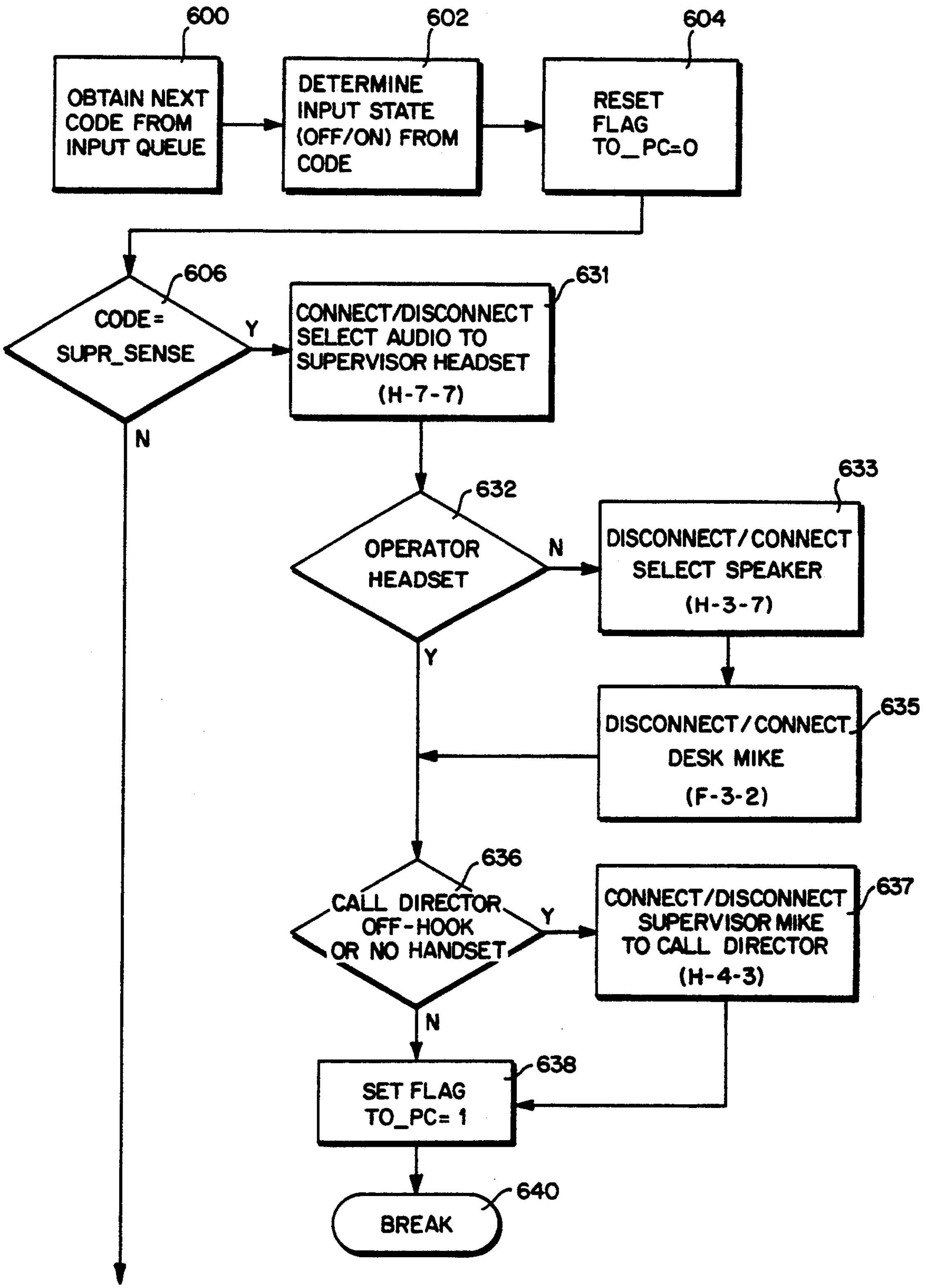
FIG. 9A–9E are a schematic view of steps executed by a routine of the communications and dispatching system of the embodiment of FIG. 1 which sends commands to an audio tower caused by receipt of a scanner interrupt.
Figure 9B:
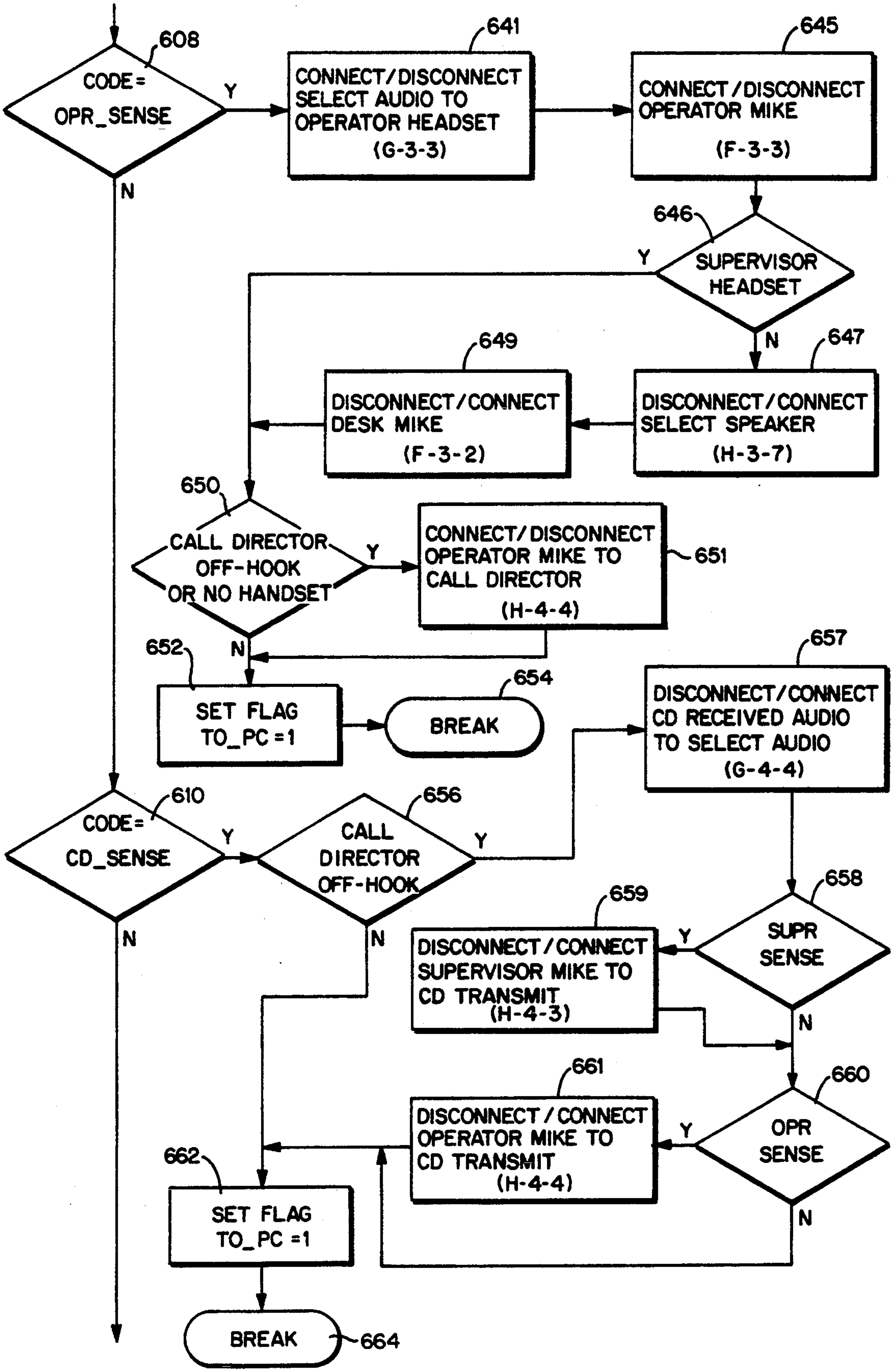
Figure 9C:
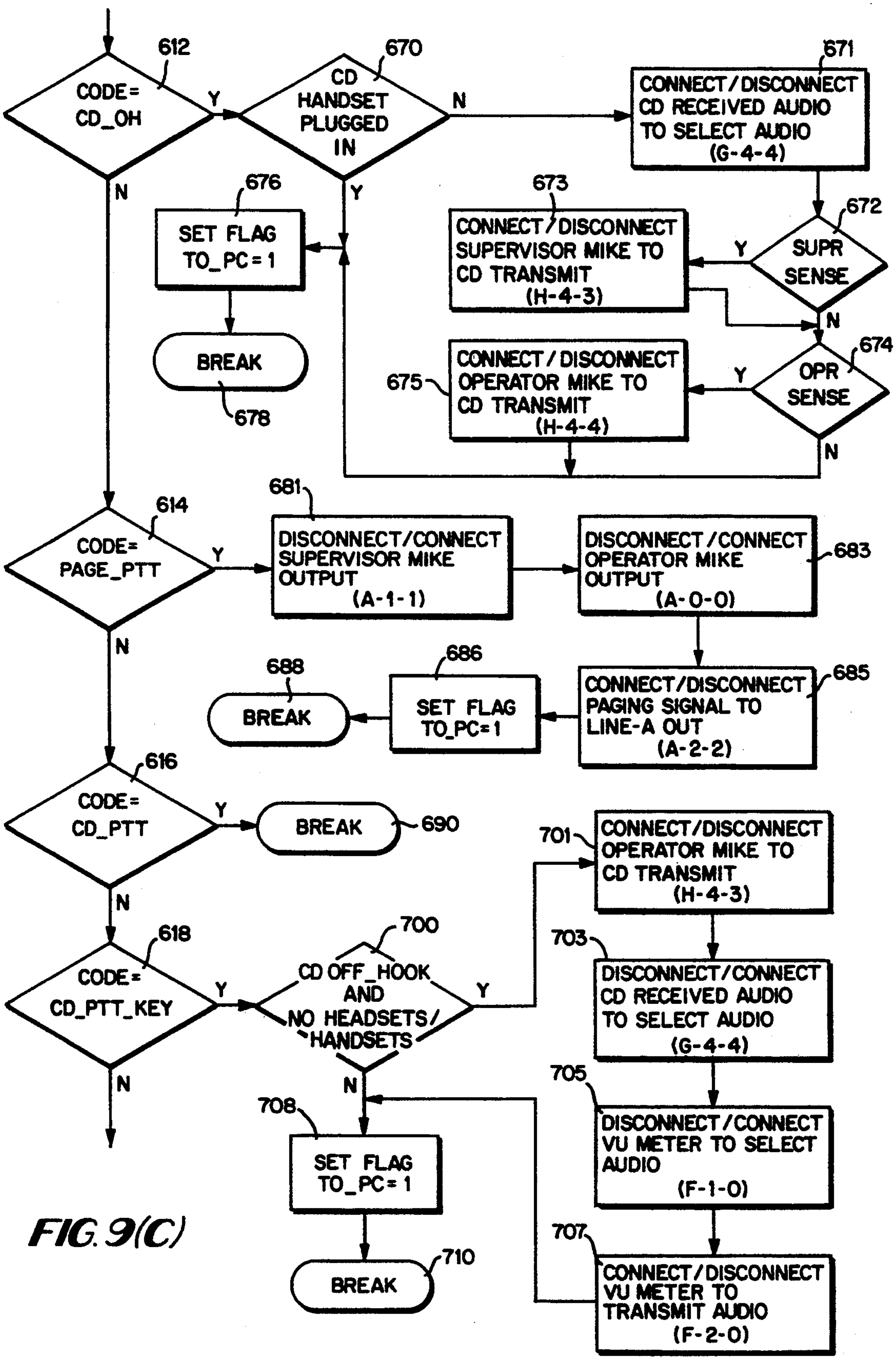
Figure 9D:
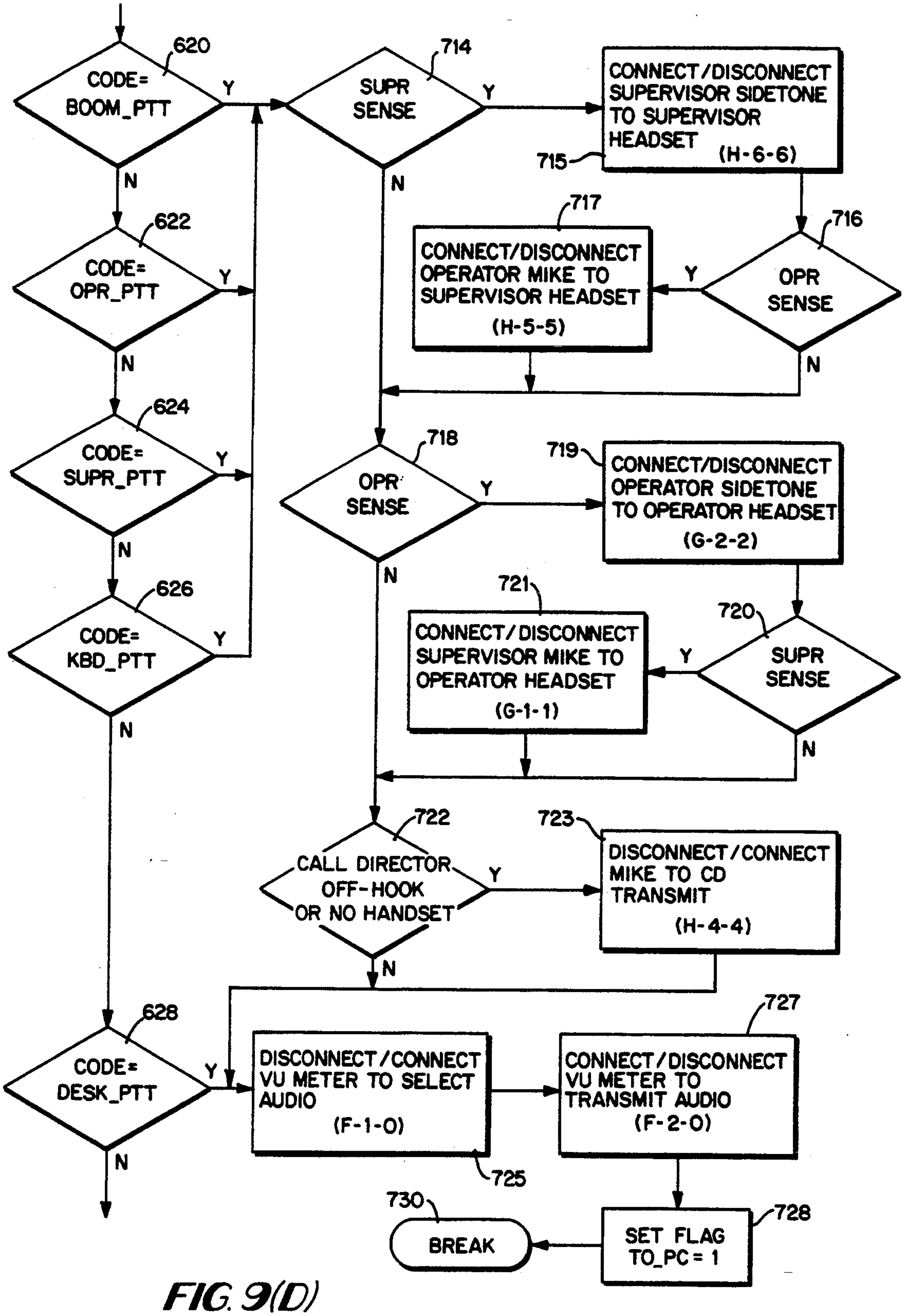
Figure 9E:
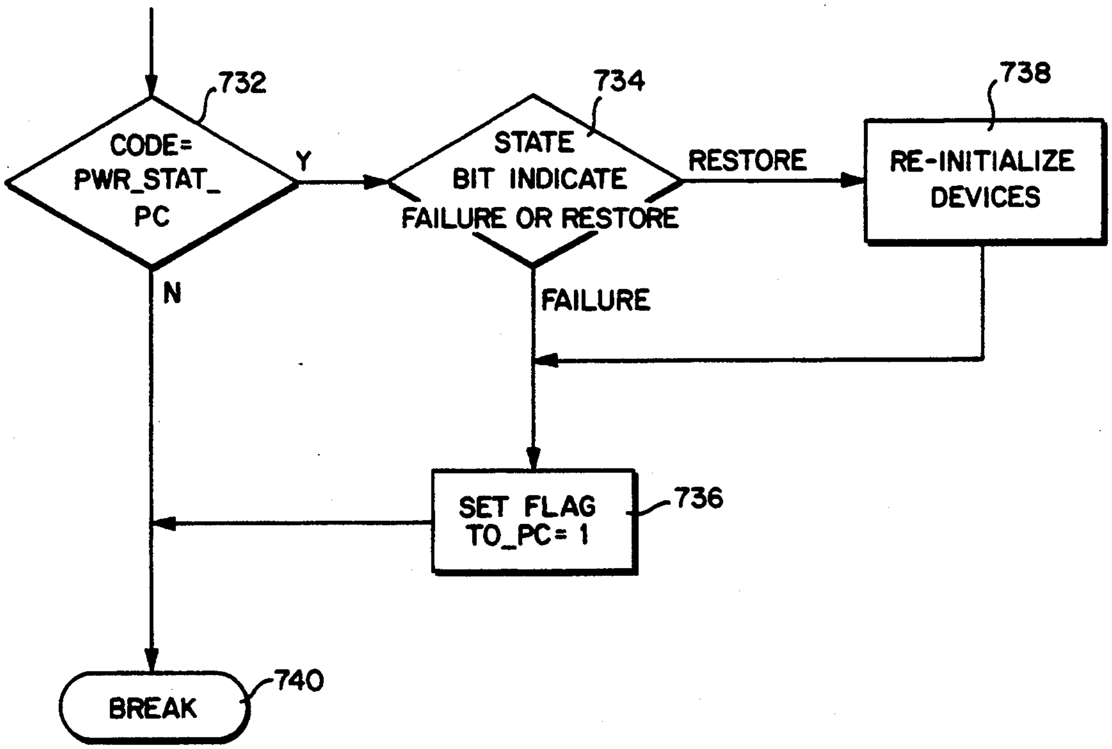

When not interrupted, the microprocessor 300 continuously executes the routine MAIN LOOP stored in EPROM 302 and depicted by the steps shown in FIG. 8. The MAIN LOOP routine functions to send commands to the audio tower 24 generated by receipt of a scanner interrupt (steps 560–566); to send commands originated by the main processor 50 to the audio tower 24 (steps 568–572); and, to set the tone generator 308 (steps 574–576).

With respect to sending commands to the audio tower as a result of a scanner interrupt, at step 560 the microprocessor determines whether the queue SCANNER QUEUE is empty. If SCANNER QUEUE is empty (meaning that no input from the audio tower has changed state), the routine MAIN LOOP jumps to step 568. If SCANNER QUEUE is not empty, at step 562 the microprocessor examines the next-awaiting code in the SCANNER QUEUE (the code having been created at step 510 of routine SCANNER INTERRUPT). Then, by calling a routine INPROC at step 564, the microprocessor sends an appropriate command, dependent on the code fetched from SCANNER QUEUE, to the audio tower 24. The routine INPROC is described in greater detail below with reference to FIG. 9. After sending the command to the audio tower 24, the microprocessor then sends the code to the main processor system 50 (step 566). Sending the code to the main processor system 50 involves storing the code in the DPRAM 320 and interrupting the main processor system 50.

At step 568 the microprocessor 300 determines whether the co-processor system 52 has received a new command originated by the main processor system 50. Commands "originated" by the main processor system 50 are of two basic types: commands created by the dispatcher (e.g., by using keyboard 26) or commands formed by the main processor system 50 as a result of control information received from the network switch on the control cable 59.

Commands originated by the main processor system 50 are communicated over bus 60 to the DPRAM 320. If a new command has not been received from the main processing system 50, execution jumps to step 574. Otherwise, at step 570 the microprocessor 300 obtains the new command from the DPRAM 320 and, at step 572, sends to the audio tower 24 a tower command which is based on the new command received from the main processing system 50. The operation of step 572 is explained in greater detail below with reference to a routine OUTPROC (illustrated by FIG. 6).

At step 574 the microprocessor 300 determines whether there is a new tone command by checking an specified flag. If there is no new tone command, the microprocessor 300 loops back to execute step 560. Otherwise, at step 576, the microprocessor 300 sets the tone generator 308 in accordance with the new tone command, and then loops back to execute step 560. The new tone command can specify the type of tone to be generated (e.g., warbletone), the frequency of the tone, and the duration of the tone.

OPERATION: SENDING COMMANDS TO TOWER AFTER SCANNER INTERRUPT

FIG. 9 shows steps taken by the microprocessor 300 when executing the routine INPROC for sending commands to the audio tower 24 as a result of the receipt of an input from the audio tower 24. Thus, although referenced as steps hereinafter, the steps of FIG. 9 are actually substeps of step 564 of FIG. 8.

When executing the routine INPROC, the microprocessor obtains the next code from the input queue (SCANNER QUEUE) at step 600, and then determines the input state (e.g., OFF/ON) from the highest-order bit of the obtained code (step 602), the state being "ON" if the highest-order bit is high. A flag TO_PC, which indicates whether the code is also to be sent to the main processing system 50 (see step 566 of FIG. 8) for display by the main processing system on CRT 28 is then reset to zero (step 604.

After the preparatory steps 600, 602, and 604, the microprocessor 300 performs a switch operation whereby, in accordance with the value of the input code, execution jumps to an appropriate step on a case basis. In this respect, execution jumps to one of the following steps in accordance with the value of the input code:

| code | step |
|---|---|
| SUPR_SENSE | 606 |

-continued

| code | step |
|---|---|
| OPR_SENSE | 608 |
| CD_SENSE | 610 |
| CD_OH | 612 |
| PAGE_PTT | 614 |
| CD_PTT | 616 |
| CD_PTT_KEY | 618 |
| BOOM_PTT | 620 |
| OPR_PTT | 622 |
| SUPR_PTT | 624 |
| KEY_PTT | 626 |
| DESK_PTT | 628 |
| PWR_STAT_PC | 732 |

The foregoing input codes, with the exception of KEY_PTT and CD_PTT_KEY, are seen (in FIG. 5) to correspond with inputs (carried by interface cable 102) to the inversion diode protection circuits (IDPCs) 330. The input codes KEY_PTT and CD_PTT_KEY are loaded into SCANNER QUEUE by the microprocessor 300 when the microprocessor detects that a new key has been pressed on the co-processor keyboard 62.

When the input code is SUPR_SENSE (meaning that the supervisor headset 38 has been plugged in or unplugged), the microprocessor 300 executes step 631 to set switch array 220H. At step 631, a signal SELECT AUDIO (shown in FIG. 9 as "SEL") is either connected or disconnected, depending on the value of the command input state, to lines leading to the supervisor headset 38.

If it is determined at step 632 that the signal OPR SENSE is high (e.g., that the operator headset 36 has been plugged in), steps 633 and 635 are executed before execution resumes at step 636. At step 633 the switch array 220H is set to either disconnect or connect the select speaker 40. At step 635 the switch array 220F is set to either disconnect or connect the desk microphone 34.

If it is determined at step 636 that both the call director 86 is off-hook and a handset is not active (by examining the signals CD OH and CD SENSE), then step 637 is executed prior to execution resuming at step 638. At step 637 the switch array 220H is set to either connect or disconnect the microphone of the supervisor headset 38 to the call director 86. At step 638 the flag TO_PC is set to "1" prior to exiting (step 640) from the routine INPROC.

When the input code is OPR_SENSE (meaning that the operator headset 36 has just been plugged in or unplugged), the microprocessor 300 executes step 641 to set switch array 220G. At step 641, the signal SELECT AUDIO is either connected or disconnected, depending on the value of the command input state, to lines leading to the operator headset 36. At step 645, switch array 220F is set to either connect or disconnect the microphone of the operator headset 36.

At step 646 the signal SUPER SENSE is examined to determine if the microphone of the supervisor headset 38 is in use. If not, steps 647 and 649 are executed prior to executing step 650. At step 647, switch array 220H is set to either disconnect or connect the select speaker 40. At step 649, the switch array 220F is set to either disconnect or connect the desk microphone 34.

At step 650 the microprocessor checks, much in the manner of step 636, whether both the call director 86 is off-hook and the handset is not active. If both are truer step 651 is executed prior to step 652. At step 651, switch array 220H is set to connect or disconnect the microphone of the operator headset 36 from the call director 86. Then, at step 652, the flag TO_PC is set to "1" prior to exiting the routine INPROC (step 654).

When the input code is CD_SENSE (meaning that the status of the handset of the call director 86 has changed), the microprocessor 300 executes step 656 to determine (by analyzing signal CD OH) if the call director 86 is off-hook. If the call director 86 is off-hook, step 657 is executed to set switch array 220G whereby the signal SELECT AUDIO is either connected or disconnected, depending on the value of command input state, to lines leading to the call director 86. After step 657, step 658 is executed to determine if the supervisor headset 38 is active (e.g., whether signal SUPR SENSE is high). If signal SUPR SENSE is high, step 659 is executed prior to executing step 660. At step 659, the switch array 220H is set to either disconnect or connect the microphone of the supervisor headset 38 to the call director transmit line. Then, if it is determined at step 660 that the operator headset is active (i.e., signal OPR SENSE is high), at step 661 the switch array 220H is set to either disconnect or connect the microphone of the operator headset 36 to the transmit line of the call director 86.

Execution jumps to step 662 when one of the following occurs: the call director 86 is not off-hook (from step 656); the determination of step 660 is negative; or, step 661 is completed. At step 662, the flag TO_PC is set to "1" prior to exiting (step 664) the routine INPROC.

When the input code is CD_OH (meaning that the hook status of the call director 86 has changed), the microprocessor 300 executes step 670 to determine (by analyzing signal CD SENSE) if the handset of the call director 86 is plugged in. If the handset is not plugged in, step 671 is executed to set switch array 220G whereby the signal SELECT AUDIO is either connected or disconnected, depending on the value of command input state, to lines leading to the call director 86. After step 671, step 672 is executed to determine if the supervisor headset 38 is active (e.g., whether signal SUPR SENSE is high). If signal SUPR SENSE is high, step 673 is executed prior to executing step 674. At step 673, the switch array 220H is set to either connect or disconnect the microphone of the supervisor headset 38 to the call director transmit line. Then, if it is determined at step 674 that the operator headset is active (i.e., signal OPR SENSE is high), at step 675 the switch array 220H is set to either connect or disconnect the microphone of the operator headset 36 to the transmit line of the call director 86.

Execution jumps to step 676 when one of the following occurs: the handset of the call director 86 is plugged in (from step 670); the determination of step 674 is negative; or, step 675 is completed. At step 676, the flag TO_PC is set to "1" prior to exiting (step 678) the routine INPROC.

When the input code is PAGE_PTT (meaning that the status of the pager push-to-talk has changed), the microprocessor 300 executes steps 681, 683, and 685 for setting switch array 220A. At step 681, the microphone of the supervisor headset 38 is either disconnected or connected, depending on the value of command input state. At step 683, the microphone of the operator headset 36 is either disconnected or connected, depending on the value of command input state. At step 685, a paging signal is connected to line A out (line 100A). At step 686, the flag TO_PC is set to "1" prior to exiting (step 688) the routine INPROC.

When the input code is CD_PTT, the routine INPROC is simply exited (step 690).

When the input code is CD_PTT_KEY, at step 700 the signals CD OH and CD SENSE are examined to determine if both the call director 86 is off-hook and the call director handset is unplugged. If both an off-hook and unplugged conditions occur, steps 701, 703, 705 and 707 are consecutively executed prior to the execution of step 708. At step 701, the switch array 220H is set to connect or disconnect the microphone of the operator headset 36 to a line leading to the call director 86. At step 703, the switch array 220G is set to disconnect or connect audio reception by the call director 86 with a line SELECT AUDIO. At step 705, the switch array 220F is set to disconnect or connect the VU Meter circuit 222 with the line SELECT AUDIO. At step 707, the switch array 220F is set to connect or disconnect the VU Meter circuit 222 with a line TRANSMIT AUDIO. At step 708, the flag TO_PC is set to "1" prior to exiting (step 710) the routine INPROC.

When the input code is either BOOM_PTT, OPR_PTT, SUPR_PTT, or KBD_PTT, execution branches to step 714. At step 714, the signal SUPR SENSE is examined to determine if the supervisor headset 38 is active. If the signal SUPR SENSE is high, steps 715, 716, and (conditionally) 717 are executed prior to the execution of step 718. At step 715, the switch array 220H is set to connect or disconnect the supervisor sidetone signal to the supervisor headset 38. Then, if it is determined at step 716 that the operator headset 36 is also active (by examining signal OPR SENSE), at step 717 the switch array 220H is set to connect or disconnect the microphone of the operator headset 36 to the supervisor headset 38.

At step 718 the signal OPR SENSE is examined to determine if the operator headset 36 is active. If the signal OPR SENSE is high, steps 719, 720, and (conditionally) 721 are executed prior to the execution of step 722. At step 719, the switch array 220G is set to connect or disconnect the operator sidetone signal to the operator headset 36. Then, if it is determined at step 720 that the supervisor headset 38 is also active (by examining signal SUPR SENSE), at step 721 the switch array 220G is set to connect or disconnect the microphone of the supervisor headset 38 to the operator headset 36.

At step 722 the signals CD OH and CD SENSE are examined to determine if CD OH is high and CD SENSE is low. If CD OH is high and CD SENSE is low, step 723 is executed prior to step 725. At step 723; the switch array 220H is set to disconnect or connect the microphone of the operator headset 36 to the line leading to the call director 86.

Steps 725, 727, 728, and 730 are reached either after the execution of step 722, after the execution of step 723, or when the input code is DESK_PTT. At step 725 the switch array 220F is set to disconnect or connect the VU Meter circuit 222 to the line SELECT AUDIO. At step 727 the switch array 220F is set to connect or disconnect the VU Meter circuit 222 to the line TRANSMIT AUDIO. At step 728, the flag TO_PC is set to "1" prior to exiting (step 730) the routine INPROC.

When the input code is PWR_STAT_PC, execution branches to step 734. At step 734 the state bit of the input code is examined to determine whether the input code indicates that the power monitoring and reset circuit 223 of the audio tower 24 has detected a power failure or a power restoration. In the event of a power failure, step 736 is executed so that the flag TO_PC is set to "1" for informing the host processor system 50 of the power status. In the event of a power restoration, the step 738 is executed (prior to execution of step 736) to re-initialize the devices included in the audio tower. The re-initialization conducted at step 738 is substantially the same as the initialization of the devices described below in connection with the routine OUTPROC.

OPERATION: SENDING PC COMMANDS TO TOWER

Figure 6:
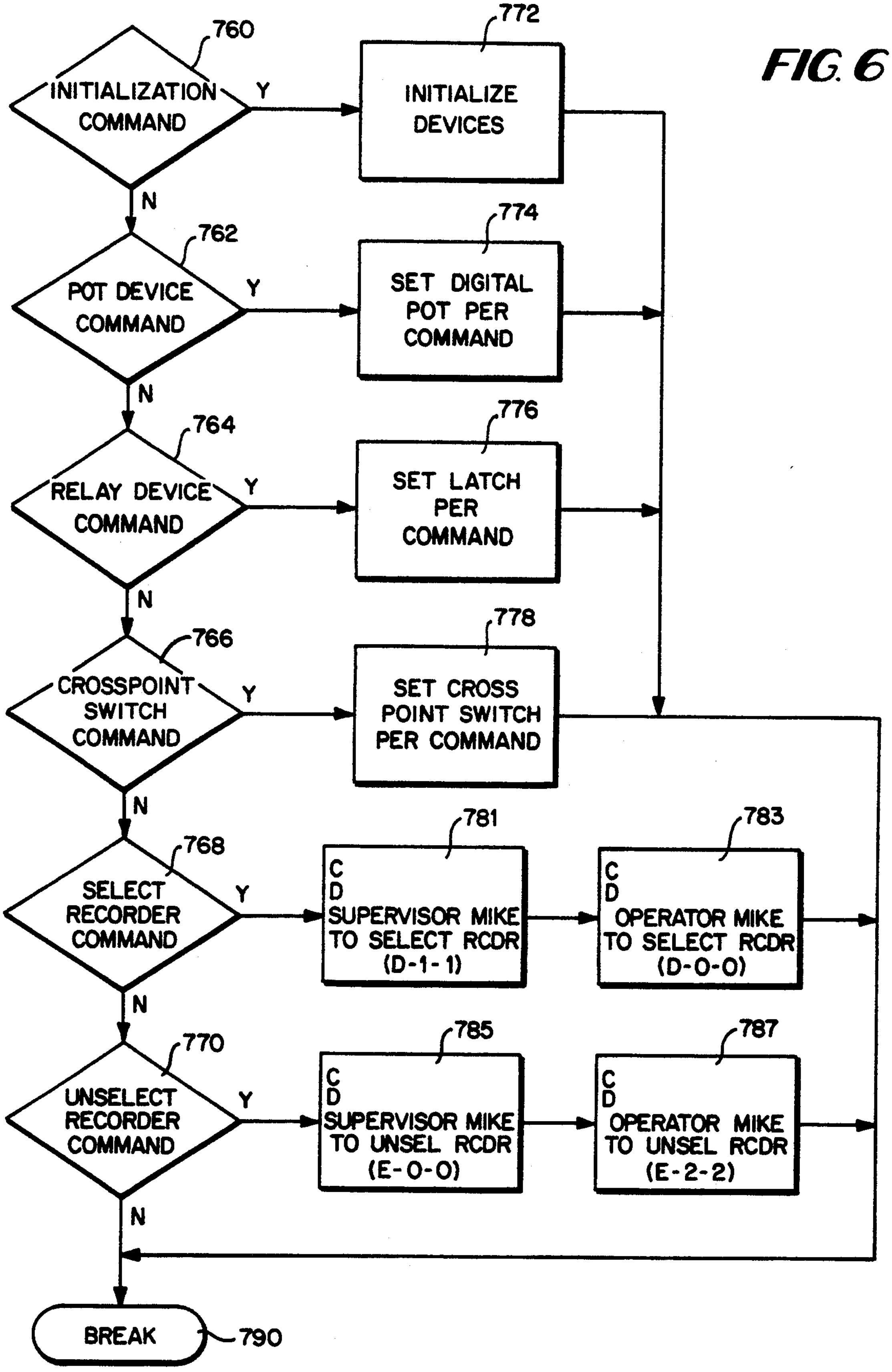
FIG. 6 is a schematic view of steps executed by a routine of the communications and dispatching system of the embodiment of FIG. 1 which sends PC commands to an audio tower.

FIG. 6 shows steps taken by the microprocessor 300 when executing the routine OUTPROC for sending commands to the audio tower 24 as a result of the receipt of a command from the main processing system 50 (i.e., a 37 PC command"). Thus, although referenced as steps hereinafter, the steps of FIG. 6 are actually substeps of step 572 of FIG. 8.

The routine OUTPROC basically determines the type of command received from the main processing system 50 and uses parameters included in the command for setting switches or establishing values for other elements of the matrix switching circuit 74. To this end, the routine OUTPROC includes a switch-type instruction for branching to an appropriate case location in accordance with command type.

In the above regard, in executing the routine OUTPROC the microprocessor 300 checks (at step 760) whether the PC command is an initialization command; checks (at step 762) whether the PC command is a pot (potentiometer) device command; checks (at step 764) whether the PC command is a relay device command; checks (at step 766) whether the PC command is a cross point switch command; checks (at step 768) whether the PC command is a select recorder command; and, checks (at step 770) whether the PC command is an unselect recorder command.

If the PC command received from the host processor system 50 is an initialization command, at step 772 the microprocessor initializes the circuit components of the matrix switch circuit 72. In initializing the circuit 72, all digital potentiometers are set to maximum values. All switch arrays 220 are first disconnected, after which default connections are implemented.

Among the default connections implemented at step 772 are the following: at array 220G the line SEL is connected to the line SEL SUM; at array 220F the lines LINE A IN, LINE B IN, LINE C IN, and LINE D IN are respectively connected to the lines SEL, UNSEL1, UNSEL2, UNSEL 3; at array 220A the lines SUPR MIC OUT and OPR MIC OUT are connected to the line LINE A OUT; at array 220E the line LINE A OUT is connected to the line XMT VU; at array 220F the line to the VU Meter circuit 220 is connected to the line SEL; and, at array 220G the line TONE is connected to the line SEL SUM. The manner in which these connections are made is understood from the preceding discussion of the microprocessor 300's use of the DATA, STROBE, SELECT, and ADDR lines to affect a switch array 220.

If the PC command received from the host processor system 50 is a pot device command, at step 774 the microprocessor sets the digital potentiometer specified in the PC command to a value specified in the PC command. In this regard, the PC command specifies the number of the digital potentiometer affected by the command, and the value for the affected pot.

If the PC command received from the host processor system 50 is a relay device command, at step 776 the microprocessor turns a relay devices specified in the PC command either ON or OFF in accordance with a state value of the PC command.

If the PC command received from the host processor system 50 is a cross point switch command, at step 778 the microprocessor 300 issues a tower command to the audio tower 24 to set the cross point switch specified in the PC command in a manner specified in the PC command. The manner in which these connections are made is understood from the preceding discussion of the microprocessor 300's use of the DATA, STROBE, SELECT, and ADDR lines to affect a switch array 220. The cross point switches indicated with a dot in FIG. 4 (e.g., dot 500) include those which are settable in response to a PC command.

If the PC command received from the host processor system 50 is a select recorder command, the microprocessor executes steps 781 and 783. At step 781 switch 220D is set to connect or disconnect the line SUPR MIC OUT (i.e., the line to the microphone of the supervisor headset 38) to the select recorder 88 (line SEL RCDR HI). At step 783 the switch 220D is set to connect or disconnect the line OPR MIC OUT (i.e., the line to the microphone of the operator headset 36) to the select recorder 88.

If the PC command received from the host processor system 50 is an unselect recorder command, the microprocessor executes steps 785 and 787. At step 785 switch 220E is set to connect or disconnect the line SUPR MIC OUT (i.e., the line to the microphone of the supervisor headset 38) to the unselect recorder 90 (line UNSEL RCDR HI). At step 787 the switch 220E is set to connect or disconnect the line OPR MIC OUT (i.e., the line to the microphone of the operator headset 36) to the unselect recorder 90.

The select recorder command and the unselect recorder command issued by the main processor system 50 are examples of commands capable of origination by input from the main system keyboard 26.

After the execution of step 772, step 774, step 776, step 778, step 783, or step 787, the routine OUTPROC is exited (step 790).

OPERATION: VU METER CIRCUIT

The VU Meter Circuit 222 receives either the input audio from the line selected by switch array 220F (the SEL signal) or the output audio of a line selected by array 220E, depending on the setting of the switch array 220F. The VU Meter Circuit 222 analyzes the signal it receives from the X0 coordinate of the switch array 220F, and sends a signal VU PC on interface cable 102 to the co-processor 52. The signal VU PC is conditioned (by co-processor circuit 352) and applied to the ADC 350. After a logarithmic scaling of the converted digital value, and if the value has changed since the last conversion, the digital output is stored in the DPRAM 320 and a flag is set for interrupting the host processor 50. A bar code display at the host processor 50 is driven in accordance with the digital output value received by the processor 50, which value is indicative of the decibel level of the analyzed audio.

EPILOGUE

The co-processor system 52 of the present invention thus controls the audio tower 24 by setting the plurality of cross point switch arrays 220 for establishing the desired signal routing between selected audio communications devices. In this regard, the co-processor system 52 sends commands to the audio tower 24 when so prompted either by a command from the main processor system 30 or by a scanner interrupt occasioned by a changed device activation state. The cross point switch arrays 220 housed in the audio tower 24 are physically remote from potentially deleterious high frequency signals, such as clock signals.

While the invention has been particularly shown and described with reference to the preferred embodiments thereof, it will be understood by those skilled in the art that various alterations in form and detail may be made therein without departing from the spirit and scope of the invention.

The embodiments of the invention in which an exclusive property or privilege is claimed are defined as follows:

1. An audio communications interface device coupled to a dispatch console in a radio frequency (RF) communications system, said interface device couplable via audio lines to output audio paths in said RF communications system and to a telephone network, said interface device comprising:

a plurality of dissimilar audio input or output devices coupled to a plurality of switches in the audio communications interface device, said dissimilar audio input or output devices including a microphone, speaker and headset, said audio input or output devices switchably couplable to the output audio paths in both the RF communication system and telephone network:

said switches establish settable relationships between said plurality of audio input or output devices and said output audio paths, one of the switches being a selector switch which is connected to receive input audio from a plurality of audio input or output devices and to couple a selected one of the connected audio I/O devices to a selector switch select output path, another of the switches being an output switch which is connected to receive an RF audio transmission on the selector switch select output path and to apply the received RF transmission as an outgoing audio transmission to an audio I/O device:

main processor means for receiving external control commands which specify a desired settable relationship between selected devices of said audio input or output devices and selectively to individual audio paths and for issuing main processor commands indicative the desired settable relationship:

a device activation input signal path connected to said selected devices for carrying a device activation input signal indicative of a state of activation of an audio communications device:

co-processor means for controlling the switches in accordance with either the main processor commands or the device activation input signals whereby desired settable relationships are automatically established between the selected audio input or output devices and selectively to individual output audio paths, the co-processor means being connected to the main processor means to receive tile main processor commands and to the device activation input signal, and a summing switch connected to receive an RF audio transmission on the selector switch select output path and to receive audio RF and telephone transmissions on a plurality of other paths, and for summing the received transmissions to provide a selected summed audio transmission on a selected sum output path.

2. The apparatus of claim 1, further comprising non-audio input/output means connected to and driven by the main processor means for displaying at the dispatch console the set relationships between the audio communications devices.

3. The apparatus of claim 1, wherein the switches are a plurality of cross point switch arrays.

4. The apparatus of claim 1, wherein the selector switch couples an unselected one of the audio I/O devices to a selector switch unselect output path.

5. The apparatus of claim 1, further comprising:

a select recorder feeding switch connected to receive the selected summed audio transmission on a selected sum output path and for applying the selected summed audio transmission to an audio recorder device.

6. A method for handling audio communications at a dispatching console for a radio frequency (RF) communications system, tile method comprising:

receiving, at a main processor, external control commands which specify a desired settable relationship between one or more of a plurality of dissimilar audio human communication devices connected to a selector switch and a selected path of a plurality of output audio paths to the radio frequency (RF) communication system and a telephone network;

issuing, from the main processor to a co-processor, commands indicative of the desired settable relationship:

using the co-processor to control, in response to the commands issued by the main processor, the selector switch for establishing settable relationships between selected audio human communication devices and selected output audio paths, connecting a plurality of audio human communication devices to the selector switch and connecting one of the connected human audio communications devices to a selector switch audio select output path;

connecting an unselected one of the audio human communication devices to a selector switch unselect output path, and summing the audio transmission on the selector switch select output path and with audio transmissions on a plurality of other paths and thereby providing a selected summed audio transmission on a selected sum output path.

7. The method of claim 6, further comprising:

receiving a device activation input signal carrying information indicative of a state of activation of an audio human communications device connected to the selector switch;

using the co-processor to control, in response to the device activation input signal, the selector switch for establishing the settable relationships.

8. The method of claim 6, further comprising using the main processor for displaying the status of the suitable relationships.

9. The method of claim 6, wherein using the co-processor to control the selector switch includes setting a plurality of cross point switches included in a plurality of cross point switch arrays.

10. The method of claim 7, further comprising:

connecting the selector switch select audio output path to a first audio human communications device;

connecting the selector switch unselect output path to a second audio human communications device.

* * * * *